US012811756B2

(12) United States Patent
Zhang et al.

(10) Patent No.: US 12,811,756 B2
(45) Date of Patent: Nov. 24, 2026

(54) USER EQUIPMENT BEHAVIOR FOR SUB-BAND FULL DUPLEX OPERATIONS

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 18/628,409

(22) Filed: Apr. 5, 2024

(65) Prior Publication Data

US 2025/0317258 A1 Oct. 9, 2025

(51) Int. Cl.
*H04L 12/00* (2006.01)
*H04L 5/00* (2006.01)

(52) U.S. Cl.
CPC .......... *H04L 5/0083* (2013.01); *H04L 5/0046* (2013.01); *H04L 5/0048* (2013.01)

(58) Field of Classification Search
CPC . H04L 5/00; H04L 5/14; H04L 5/0094; H04L 5/0083; H04L 5/0096; H04L 5/003; H04L 5/0046; H04L 5/0048; H04L 5/1438; H04W 72/51
USPC .......................................................... 370/329
See application file for complete search history.

(56) References Cited

U.S. PATENT DOCUMENTS 11,764,937 B2 * 9/2023 Abotabl ............ H04W 72/0446 370/329
2023/0125512 A1 * 4/2023 Ibrahim .................... H04L 5/14 370/329
2023/0171072 A1 * 6/2023 Ibrahim ................ H04L 5/0048 370/329
2024/0107517 A1 * 3/2024 Zhang ..................... H04L 5/003

FOREIGN PATENT DOCUMENTS

WO WO-2024010632 A1 * 1/2024 ........ H04W 72/0446
WO WO-2024020280 A1 1/2024

OTHER PUBLICATIONS

International Search Report and Written Opinion—PCT/US2025/022363—ISA/EPO—Jul. 18, 2025 (2403583WO).

* cited by examiner

*Primary Examiner* — Frantz Coby
(74) *Attorney, Agent, or Firm* — Holland & Hart LLP

(57) ABSTRACT

Methods, systems, and devices for wireless communications at a user equipment (UE) are described. The UE may receive a first control signal indicating a format pattern for one or more symbols. The UE may receive a second control signal indicating a sub-band full duplex (SBFD) format configuration for the symbols, wherein one or more first symbols of the symbols are configured as SBFD symbols and one or more second symbols different than the one or more first symbols are configured as non-SBFD slots. The UE may receive a third control signal indicating one or more modifications to the SBFD format configuration. The UE may communicate in accordance with the first control signal, the second control signal, the third control signal, and an SBFD interpretation rule associated with the one or more modifications to the SBFD format configuration.

20 Claims, 11 Drawing Sheets

USER EQUIPMENT BEHAVIOR FOR SUB-BAND FULL DUPLEX OPERATIONS

FIELD OF TECHNOLOGY

The following relates to wireless communications at a user equipment (UE), including user equipment behavior for sub-band full duplex operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless device may operate in a wireless communications system employing full-duplex communications. However, such approaches may be improved.

SUMMARY

The described techniques relate to improved methods, systems, devices, and apparatuses that support user equipment behavior for sub-band full duplex operations. For example, a user equipment (UE) may receive a first control signal 220 indicating a format pattern 240 for a plurality of symbols. The UE may receive a second control signal 225 indicating a sub-band full duplex (SBFD) format configuration for the plurality of symbols, wherein one or more first symbols of the plurality of symbols are configured as SBFD symbols, and wherein one or more second symbols different than the one or more first symbols are configured as non-SBFD slots. The UE may receive a third control signal 230 indicating one or more modifications 250 to the SBFD format configuration for the one or more first symbols, the one or more second symbols, or both. The UE may communicate in accordance with the first control signal 220, the second control signal 225, the third control signal 230, and an SBFD interpretation rule associated with the one or more modifications 250 to the SBFD format configuration.

A method for wireless communications by a user equipment (UE) is described. The method may include receiving a first control signal indicating a format pattern for a set of multiple symbols, receiving a second control signal indicating a sub-band full duplex (SBFD) format configuration for the set of multiple symbols, where one or more first symbols of the set of multiple symbols are configured as SBFD symbols, and where one or more second symbols different than the one or more first symbols are configured as non-SBFD symbols, receiving a third control signal indicating one or more modifications to the SBFD format configuration for the one or more first symbols, the one or more second symbols, or both, and communicating in accordance with the first control signal, the second control signal, the third control signal, and an SBFD interpretation rule associated with the one or more modifications to the SBFD format configuration.

A UE for wireless communications is described. The UE may include one or more memories storing processor executable code, and one or more processors coupled with the one or more memories. The one or more processors may individually or collectively be operable to execute the code to cause the UE to receive a first control signal indicating a format pattern for a set of multiple symbols, receive a second control signal indicating a sub-band full duplex (SBFD) format configuration for the set of multiple symbols, where one or more first symbols of the set of multiple symbols are configured as SBFD symbols, and where one or more second symbols different than the one or more first symbols are configured as non-SBFD symbols, receive a third control signal indicating one or more modifications to the SBFD format configuration for the one or more first symbols, the one or more second symbols, or both, and communicate in accordance with the first control signal, the second control signal, the third control signal, and an SBFD interpretation rule associated with the one or more modifications to the SBFD format configuration.

Another UE for wireless communications is described. The UE may include means for receiving a first control signal indicating a format pattern for a set of multiple symbols, means for receiving a second control signal indicating a sub-band full duplex (SBFD) format configuration for the set of multiple symbols, where one or more first symbols of the set of multiple symbols are configured as SBFD symbols, and where one or more second symbols different than the one or more first symbols are configured as non-SBFD symbols, means for receiving a third control signal indicating one or more modifications to the SBFD format configuration for the one or more first symbols, the one or more second symbols, or both, and means for communicating in accordance with the first control signal, the second control signal, the third control signal, and an SBFD interpretation rule associated with the one or more modifications to the SBFD format configuration.

A non-transitory computer-readable medium storing code for wireless communications is described. The code may include instructions executable by one or more processors to receive a first control signal indicating a format pattern for a set of multiple symbols, receive a second control signal indicating a sub-band full duplex (SBFD) format configuration for the set of multiple symbols, where one or more first symbols of the set of multiple symbols are configured as SBFD symbols, and where one or more second symbols different than the one or more first symbols are configured as non-SBFD symbols, receive a third control signal indicating one or more modifications to the SBFD format configuration for the one or more first symbols, the one or more second symbols, or both, and communicate in accordance with the first control signal, the second control signal, the third control signal, and an SBFD interpretation rule associated with the one or more modifications to the SBFD format configuration.

In some examples of the method, user equipment (UEs), and non-transitory computer-readable medium described herein, communicating in accordance with the first control signal, the second control signal, the third control signal, and the SBFD interpretation rule may include operations, features, means, or instructions for disregarding, in accordance with the SBFD interpretation rule, one or more first modifications of the one or more modifications indicated as overriding one or more configurations of the one or more first symbols and applying, to the SBFD format configuration in accordance with the SBFD interpretation rule, one or more second modifications of the one or more modifications indicated as overriding one or more configurations of the one or more second symbols.

In some examples of the method, user equipment (UEs), and non-transitory computer-readable medium described herein, disregarding the one or more first modifications may include operations, features, means, or instructions for disregarding modification of a flexible symbol configured with an uplink subband or configured as a SBFD symbol to a downlink symbol or an uplink symbol, disregarding modification of a non-SBFD symbol to a SBFD symbol, or both.

In some examples of the method, user equipment (UEs), and non-transitory computer-readable medium described herein, communicating in accordance with the first control signal, the second control signal, the third control signal, and the SBFD interpretation rule may include operations, features, means, or instructions for disregarding, in accordance with the SBFD interpretation rule, one or more first modifications of the one or more modifications indicated as overriding one or more configurations of the one or more first symbols and disregarding, in accordance with the SBFD interpretation rule, one or more second modifications of the one or more modifications indicated as overriding one or more configurations of the one or more second symbols.

In some examples of the method, user equipment (UEs), and non-transitory computer-readable medium described herein, communicating in accordance with the first control signal, the second control signal, the third control signal, and the SBFD interpretation rule may include operations, features, means, or instructions for determining, based on one or more first modifications of the one or more modifications indicated as overriding one or more configurations of at least one of the one or more first symbols as flexible symbols, respective communication directionalities associated with symbols indicated in the one or more first modifications, where the respective communication directionalities indicate uplink transmissions to be communicated in uplink sub-bands of the one or more first symbols, downlink transmissions to be communicated in downlink sub-bands of the one or more first symbols, or any combination thereof and communicating one or more transmissions in accordance with the determined respective communication directionalities in one or more uplink sub-bands, one or more downlink sub-bands, or both, that may be associated with the symbols indicated in the one or more first modifications.

In some examples of the method, user equipment (UEs), and non-transitory computer-readable medium described herein, communicating in accordance with the first control signal, the second control signal, the third control signal, and the SBFD interpretation rule may include operations, features, means, or instructions for applying, to the SBFD format configuration in accordance with the SBFD interpretation rule, one or more second modifications of the one or more modifications indicated as overriding one or more configurations of the one or more second symbols.

Some examples of the method, user equipment (UEs), and non-transitory computer-readable medium described herein may further include operations, features, means, or instructions for transmitting an indication of a capability of the UE to determine the respective communication directionalities, where the respective communication directionalities may be determined based on the capability of the UE.

In some examples of the method, user equipment (UEs), and non-transitory computer-readable medium described herein, communicating in accordance with the first control signal, the second control signal, the third control signal, and the SBFD interpretation rule may include operations, features, means, or instructions for determining, based on one or more first modifications of the one or more modifications indicated as overriding one or more configurations of at least one of the one or more first symbols as flexible symbols, respective communication directionalities associated with symbols indicated in the one or more first modifications, where the respective communication directionalities indicate uplink transmissions to be communicated in uplink sub-bands of the one or more first symbols, downlink transmissions to be communicated in downlink sub-bands of the one or more first symbols, or any combination thereof and communicating one or more transmissions in accordance with the determined respective communication directionalities in one or more uplink sub-bands, one or more downlink sub-bands, or both, that may be associated with the symbols indicated in the one or more first modifications.

In some examples of the method, user equipment (UEs), and non-transitory computer-readable medium described herein, communicating in accordance with the first control signal, the second control signal, the third control signal, and the SBFD interpretation rule may include operations, features, means, or instructions for applying, to the SBFD format configuration in accordance with the SBFD interpretation rule, one or more second modifications of the one or more modifications indicated as overriding one or more configurations of the one or more second symbols.

Some examples of the method, user equipment (UEs), and non-transitory computer-readable medium described herein may further include operations, features, means, or instructions for transmitting an indication of a capability of the UE to determine the respective communication directionalities, where the respective communication directionalities may be determined based on the capability of the UE.

In some examples of the method, user equipment (UEs), and non-transitory computer-readable medium described herein, the second control signal indicates a UE-common configuration parameter and the third control signal includes group-common downlink control information signaling that includes a slot format indicator field or radio resource control signaling that includes a UE-dedicated slot format configuration.

In some examples of the method, user equipment (UEs), and non-transitory computer-readable medium described herein, a format of the group-common downlink control information signaling may be a group-common downlink control information format 2_0 or a group-common downlink control information format 2_x.

DETAILED DESCRIPTION

In wireless communications, slots or symbols in which wireless devices (e.g., such as a user equipment (UE)) may communicate may be assigned to be downlink (DL) slots, uplink (UL) slots, or flexible (F) slots. In some examples, control signaling may indicate (e.g., via one or more parameters such as TDD-UL-DL-ConfigCommon) which format or type one or more symbols are designated to be. However, other parameters (e.g., TDD-UL-DL-ConfigDedicated or a symbol format indicator (SFI)) may update or override such designations of symbol format originally provided. Further, in some examples, wireless devices may operate in accordance with sub-band full-duplex (SBFD) techniques in which downlink slots, flexible slots, or both, may be repurposed for full-duplex communications in which both uplink and downlink transmissions may be performed in a same symbol but in different sub-bands. However, UE operation and behaviors in such SBFD scenarios involving updating or overriding of symbol format assignments is currently not defined, leading to ambiguity in operation.

Techniques for managing UE operation and behavior in connection with control signaling (e.g., via parameters such as TDD-UL-DL-ConfigDedicated, an SFI, or both) that modifies initial symbol format designations are described. For example, a UE receive control signaling that indicates symbol formats for a group of slots, where at least a portion of the group of slots are designated as SBFD slots or are flexible or downlink slots configured with an uplink band for SBFD operation. The UE may receive additional control signaling that purports to modify one or more of the symbol configurations for the group of slots. However, the UE may, in accordance with one or more rules (e.g., a SBFD interpretation rule) ignore or disregard modifications 250 indicated in the additional control signaling as being made to SBFD slots. Additionally, or alternatively, the UE may apply or accept modifications 250 indicated in the additional control signaling as being made to non-SBFD slots. Additionally, or alternatively, the UE may, instead of ignoring or disregarding modifications 250 to SBFD slots, interpret such modifications 250 as indications of directionality in which the UE is permitted to communicate in the SBFD slots. In this way, UE operation in connection with SBFD operations of a wireless communications system may be defined.

Aspects of the disclosure are initially described in the context of wireless communications systems. Aspects of the disclosure are then described with reference to a wireless communications system, SBFD schemes, and a process flow. Aspects of the disclosure are further illustrated by and described with reference to apparatus diagrams, system diagrams, and flowcharts that relate to user equipment behavior for sub-band full duplex operations.

Figure 1:
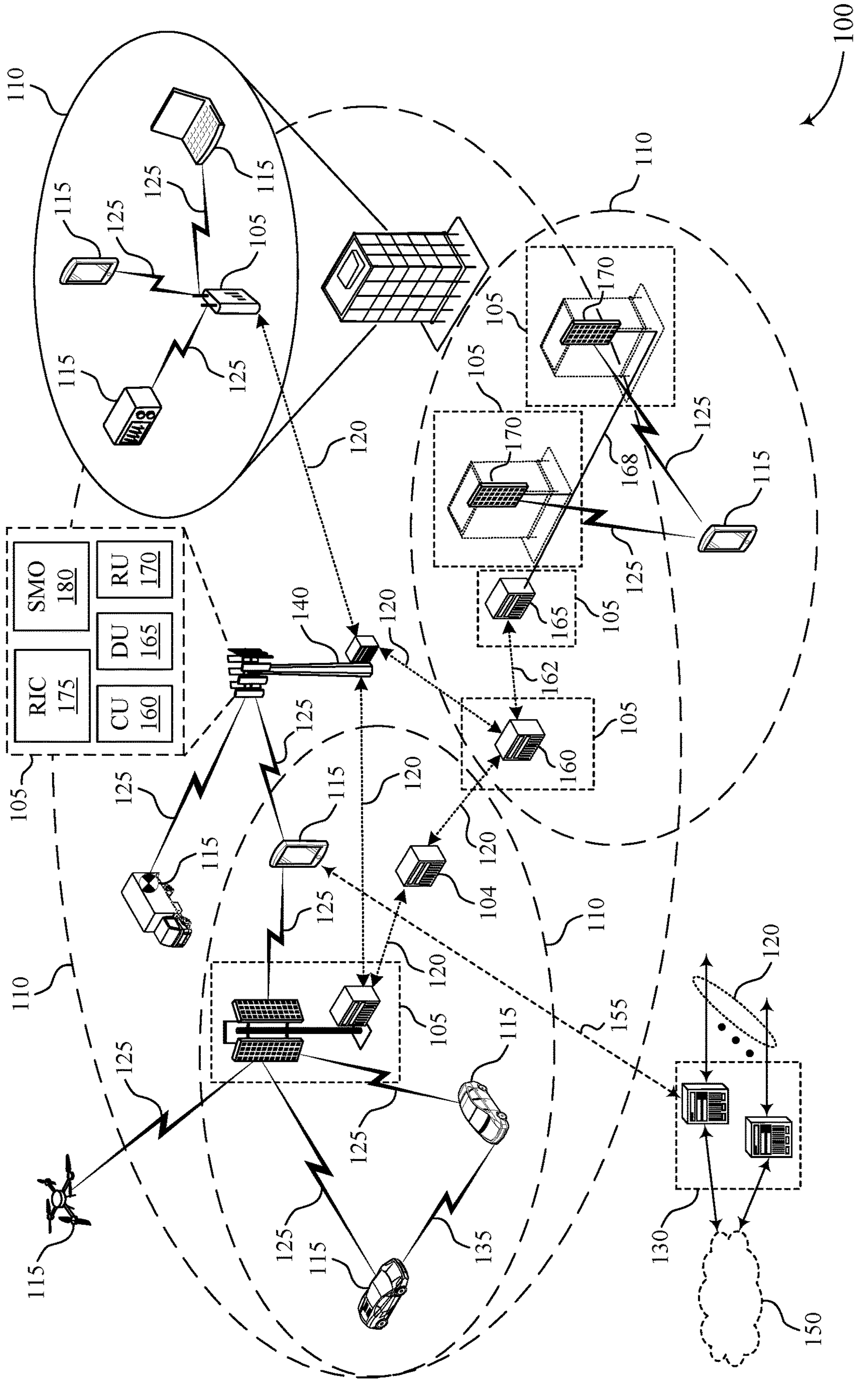
FIG. 1 shows an example of a wireless communications system that supports user equipment behavior for sub-band full duplex operations in accordance with one or more examples as disclosed herein.

FIG. 1 shows an example of a wireless communications system 100 that supports user equipment behavior for sub-band full duplex operations in accordance with one or more examples as disclosed herein. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, a UE 115 and a network entity 105 may support one or more mechanisms according to which the UE 115 and the network entity 105 may define or support UE behavior or operation in accordance with SBFD operation of the network entity 105. For example, the network entity may transmit a first control signal 220 that indicates an initial format pattern 240 designating one or more symbols (or, alternatively mini-slots, slots, or other time divisions) as UL symbols, DL symbols, flexible symbols, or any combination thereof. The network entity may transmit a second control signal 225 that may indicate an SBFD format configuration for the one or more symbols (or, alternatively, mini-slots, slots, or other time divisions) that may designate one or more symbols as SBFD symbols or as including a DL sub-band, an UL sub-band, or both. The network entity may transmit a third control signal 230 that may indicate one or more modifications 250 or overrides to the SBFD format configuration. However, the UE may ignore or disregard one or more of these modifications 250, including modifications 250 to SBFD slots, non-SBFD slots, or both. In some examples, the UE may interpret such modifications 250 or overrides as indicators of sub-bands in which the UE is permitted to communicate in the corresponding symbols. For example, an override initially indicating a change of an SBFD symbol to an UL symbol may be interpreted by the UE as an indication that the UE is permitted to communicate UL signaling in an UL sub-band of the SBFD symbol.

Figure 2:
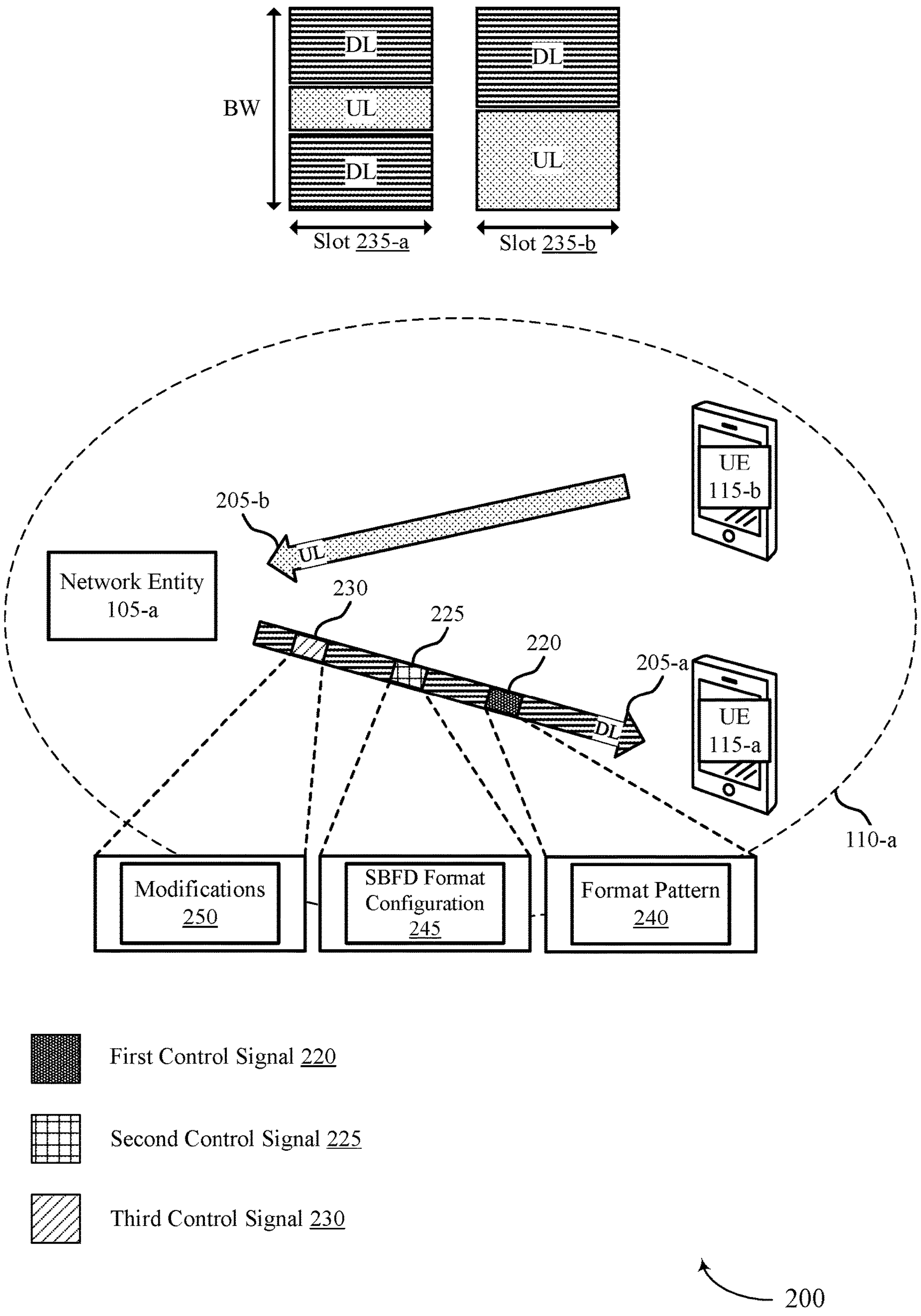
FIG. 2 shows an example of a wireless communications system that supports user equipment behavior for sub-band full duplex operations in accordance with one or more examples as disclosed herein.

FIG. 2 shows an example of a wireless communications system 200 that supports user equipment behavior for sub-band full duplex operations in accordance with one or more examples as disclosed herein. The wireless communications system 200 may include the network entity 105-*a*, which may be an example of one or more network entities discussed in relation to other figures. The wireless communications system 200 may include the UE 115-*a* and the UE 115-*b*, which may be an example of UEs discussed in relation to other figures.

In some examples, the UE 115-*a* and UE 115-*b* may be located in a geographic coverage area 110-*a* that may be associated with the network entity 105-*a*. The network entity 105-*a* may communicate with the UE 115-*a*, the UE 115-*b*, or both, via one or more downlink communication links 205-*a* and one or more uplink communication links 205-*b*.

In some examples, the network entity 105-*a* may communicate with the UE 115-*a* and the UE 115-*b* in accordance with full duplex operations. For example, the network entity 105-*a* may communicate DL signaling with the UE 115-*a* and may communicate UL signaling with the UE 115-*b* in the same time resources (or at least overlapping time resources).

In some examples, the network entity 105-*a*, the UE 115-*a* and the UE 115-*b* may communicate in accordance with an SBFD scheme in which UL and DL communications may be communicated in different sub-bands but in the same time resources. For example, as shown in symbol 235-*a*, two DL sub-bands and a single UL sub-band are designated for use in the same symbol 235-*a*. Similarly, in symbol 235-*b*, a single DL sub-band and a single UL sub-band are designated for use in the same symbol 235-*b*. Such schemes or arrangements may allow for simultaneous or overlapping transmission and reception of DL and UL signaling on a sub-band basis. Though examples of the symbol 235-*a* and the symbol 235-*b* are discussed, the discussion is equally applicable to any and all time domain divisions, including symbols, mini-slots, one or more other time divisions, or any combination thereof.

In some examples of SBFD operations, an increased UL duty cycle may be employed. Such enhancement of the UL duty cycle may lead to reduced latency. For instance, it may be feasible to transmit an UL signal in one or more UL sub-bands during DL or F slots. Additionally, or alternatively, a DL signal may be transmitted in one or more DL sub-bands in UL slots. These processes may enable significant latency savings. Additionally, or alternatively, in some examples, UL coverage may be improved. This may result in a more robust and far-reaching UL signal, thereby improving the overall performance of the wireless communication system. Further, in some examples, the system capacity, resource utilization, and spectrum efficiency may also be improved as a result of increasing the UL duty cycle. This may lead to a more efficient use of available resources and a more effective utilization of the spectrum, thereby improving the overall performance and efficiency of the wireless communication system. Further, the increase in the UL duty cycle may result in a more flexible and dynamic UL/DL resource adaptation. This adaptation may be performed according to the UL/DL traffic in a robust manner. This flexibility and dynamism may allow for a more efficient and effective management of resources, thereby improving the overall performance and efficiency of the wireless communication system.

The techniques described herein may involve techniques for promoting or supporting "SBFD-aware" UE behavior in SBFD symbols while considering interaction with previous approaches for TDD symbol configurations (or, alternatively, configurations for symbols, mini-slots, or other time divisions) associated with configuration parameters (e.g., TDD_UL-DL-ConfigurationCommon or TDD_UL-DL-ConfigCommon, TDD_UL-DL-ConfigurationDedicated or TDD_UL-DL-ConfigDedicated, an SFI (e.g., indicated in control signaling, such as DCI, including DCI format 2_0), one or more other parameters, or any combination thereof).

For example, the UE 115-*a* may receive the first control signal 220 indicating a format pattern 240 for one or more symbols (or, additionally, or alternatively, mini-slots, slots, or other time divisions). The UE may receive a second control signal 225 that includes an SBFD format configuration 245 for the symbols. The SBFD format configuration 245 may designate some symbols as SBFD symbols and some other symbols as non-SBFD symbols, or may designate one or more UL sub-bands, one or more DL sub-bands, or both that are to be included in one or more symbols. The UE may receive a third control signal 230 indicating one or more modifications 250 to the SBFD format configuration.

Such modifications 250 may indicate that one or more of the symbols (e.g., SBFD symbols, non-SBFD symbols, or both) are to be overridden and treated as another type of symbol (e.g., a DL symbol or an UL symbol). The UE may communicate in accordance with the first control signal 220, the second control signal 225, the third control signal 230, and an SBFD interpretation rule associated with the one or more modifications 250 to the SBFD format configuration.

In some examples, the second control signal 225 indicates a UE-common configuration parameter (e.g., TDD_UL-DL-ConfigurationCommon or TDD_UL-DL-ConfigCommon). In some examples, the third control signal 230 may be or may include group-common DCI signaling that includes an SFI field. Additionally, or alternatively, the third control signal 230 may be or may include RRC signaling that includes a UE-dedicated slot format configuration. In some examples, the group-common DCI signaling may be of format 2_0 or may be of a new format 2_x (e.g., a format dedicated for signaling the information included in the third control signal 230).

In some examples, the SBFD interpretation rule may indicate that the UE is to ignore or disregard some or all modifications 250 indicated in the third control signal 230 as applying to SBFD symbols, non-SBFD symbols, or both. In some examples, the SBFD interpretation rule may be different than in other examples. For example, the SBFD interpretation rule may indicate that the UE is to ignore one or more of the modifications 250 indicated in the third control signal 230, and different implementations or examples of the SBFD interpretation rule may indicate that the UE is to ignore or accept different modifications 250 applied to different symbols or symbol types. Examples of such varied interpretations made in accordance with such varied rules are described herein.

Figure 3:
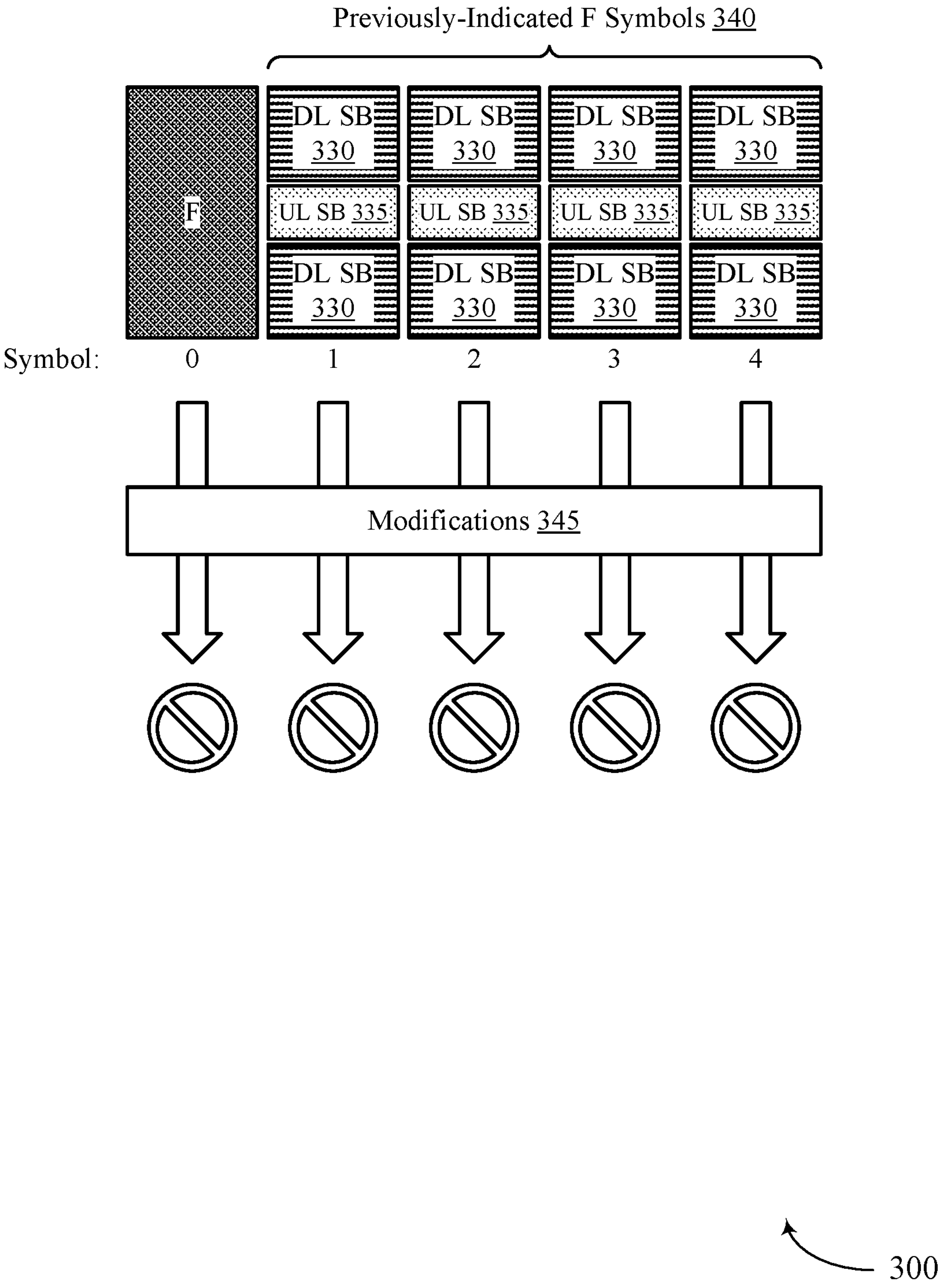
FIG. 3 shows an example of a SBFD scheme that supports user equipment behavior for sub-band full duplex operations in accordance with one or more examples as disclosed herein.

FIG. 3 shows an example of a SBFD scheme 300 that supports user equipment behavior for sub-band full duplex operations in accordance with one or more examples as disclosed herein.

The SBFD scheme 300 depicts a series of symbols (symbol 0, symbol 1, symbol 2, symbol 3, and symbol 4). Among these symbols, symbol 1, symbol 2, symbol 3, and symbol 4 are indicated as the previously-indicated F symbols 340. The previously-indicated F symbols 340 are symbols that were indicated as F symbols in the format pattern 240 included in the first control signal 220, in the SBFD format configuration 245 included in the second control signal 225, or both. In some examples, symbol 0 may be a non-SBFD symbol and symbol 1, symbol 2, symbol 3, and symbol 4 may be considered to be SBFD symbols, as they include at least one UL sub-band (e.g., the UL SB 335) and one DL sub-band (e.g., the DL SB 330) that share time resources. The modifications 345 are modifications to the SBFD format configuration 245 included in the second control signal 225 that indicate overrides or other modification of one or more of the symbols. In some examples, the modifications 345 may be included in one or more parameters, such as TDD-UL-DL-ConfigDedicated or TDD-UL-DL-ConfigurationDedicated, an SFI in control signaling such as DCI, including DCI format 2_0, or any combination thereof. In some examples, however, DCI signaling of format 2_0 may not include overrides or indications to change a symbol designated as an SBFD symbol to a non-SBFD symbol.

In some examples, in accordance with the SBFD interpretation rule, the UE may not expect or anticipate receiving a symbol update that overrides one or more F symbols (or, alternatively, mini-slots, slots, or other time divisions) on a per symbol basis (or other time domain division basis) via control signaling. For example, the UE may not or expect an update or override of symbols, such as the modifications 345 (e.g., as indicated in a parameter such as TDD-UL-DL-ConfigDedicated or TDD-UL-DL-ConfigurationDedicated, an SFI in control signaling such as DCI, including DCI format 2_0, or any combination thereof), regardless of whether the to-be-overridden symbols are SBFD symbols or not. Additionally, or alternatively, if the UE does receive such signaling, the UE may ignore or disregard such signaling (e.g., by not treating the symbols indicated in the signaling as being overridden, and instead interpreting the signals in accordance with earlier received signaling, such as the first control signal 220 carrying the format pattern 240, the second control signal 225 carrying the SBFD format configuration 245, or both). For example, as depicted in FIG. 3, all of the modifications 345 are ignored or disregarded with respect to symbol 0 (e.g., a non-SBFD symbol) and symbol 1, symbol 2, symbol 3, and symbol 4 (e.g., SBFD symbols).

However, in some examples, after the network semi-statically configures one or more SBFD symbols on F symbols, there may still be a quantity of remaining F symbols that are not SBFD symbols. Thus, if the UE ignores or disregards all modifications 345 to all of the symbols indicated, then the remaining flexible symbols may not be overridden (e.g., based on a parameter such as TDD-UL-DL-ConfigDedicated or TDD-UL-DL-ConfigurationDedicated, an SFI in control signaling such as DCI, including DCI format 2_0, or any combination thereof) even though they were not configured as SBFD symbols (e.g., in the SBFD format configuration 245 carried by the second control signal 225).

Figure 4:
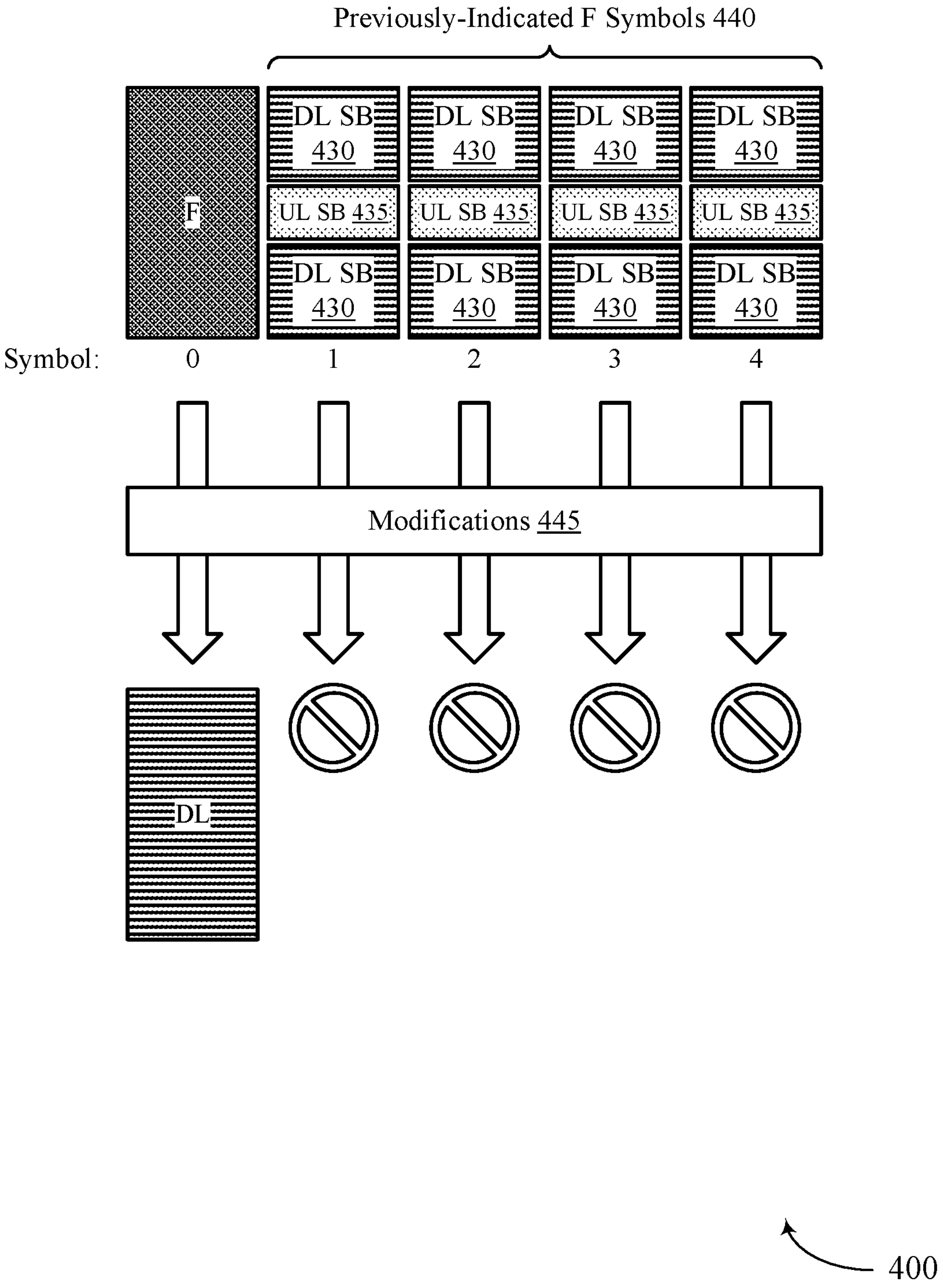
FIG. 4 shows an example of a SBFD scheme that supports user equipment behavior for sub-band full duplex operations in accordance with one or more examples as disclosed herein.

FIG. 4 shows an example of a SBFD scheme 400 that supports user equipment behavior for sub-band full duplex operations in accordance with one or more examples as disclosed herein.

The SBFD scheme 400 depicts a series of symbols (symbol 0, symbol 1, symbol 2, symbol 3, and symbol 4). Among these symbols, symbol 1, symbol 2, symbol 3, and symbol 4 are indicated as the previously-indicated F symbols 440. The previously-indicated F symbols 440 are symbols that were indicated as F symbols in the format pattern 240 included in the first control signal 220, in the SBFD format configuration 245 included in the second control signal 225, or both. In some examples, symbol 0 may be a non-SBFD symbol and symbol 1, symbol 2, symbol 3, and symbol 4 may be considered to be SBFD symbols, as they include at least one UL sub-band (e.g., the UL SB 435) and one DL sub-band (e.g., the DL SB 430) that share time resources. The modifications 445 are modifications to the SBFD format configuration 245 included in the second control signal 225 that indicate overrides or other modification of one or more of the symbols. In some examples, the modifications 445 may be included in one or more parameters, such as TDD-UL-DL-ConfigDedicated or TDD-UL-DL-ConfigurationDedicated, an SFI in control signaling such as DCI, including DCI format 2_0, or any combination thereof. In some examples, however, DCI signaling of format 2_0 may not include overrides or indications to change a symbol designated as an SBFD symbol to a non-SBFD symbol.

In some examples, in accordance with the SBFD interpretation rule, the UE may not expect or anticipate receiving a symbol update that overrides one or more F symbols (or, alternatively, mini-slots, slots, or other time divisions) on a per symbol basis (or other time domain division basis) via control signaling. For example, the UE may not or expect an update or override of symbols, such as the modifications 445 (e.g., as indicated in a parameter such as TDD-UL-DL-ConfigDedicated or TDD-UL-DL-ConfigurationDedicated, an SFI in control signaling such as DCI, including DCI format 2_0, or any combination thereof) that are configured as SBFD symbols (e.g., configured semi-statically or otherwise configured). Additionally, or alternatively, if the UE does receive such signaling, the UE may ignore or disregard such signaling that purports to modify or override assignments or configurations of the SBFD symbols (e.g., by not treating the symbols indicated in the signaling as being overridden, and instead interpreting the signals in accordance with earlier received signaling, such as the first control signal 220 carrying the format pattern 240, the second control signal 225 carrying the SBFD format configuration 245, or both). For example, as depicted in FIG. 3, all of the modifications 445 are ignored or disregarded with respect to symbol 1, symbol 2, symbol 3, and symbol 4 (e.g., SBFD symbols).

However, the UE may expect or anticipate modifications 445 (e.g., overrides) with respect to non-SBFD symbols, such as symbol 0. Additionally, or alternatively, the UE may accept or communicate in accordance with modifications 445 (e.g., overrides) to be applied to non-SBFD symbols. For example, as depicted in FIG. 4, symbol 0, that was originally configured as an F symbol, is overridden via the modifications 445 and is subsequently treated as a DL symbol as a result.

For example, if the UE is additionally provided tdd-UL-DL-ConfigurationDedicated, the parameter tdd-UL-DL-ConfigurationDedicated overrides only flexible symbols that are not configured as SBFD symbols or not configured with an UL sub-band (UL-SB) per slot over the quantity of slots as provided by tdd-UL-DL-ConfigurationCommon. Additionally, or alternatively, for a set of symbols of a slot that are indicated as DL/UL by tdd-UL-DL-ConfigurationCommon, or tdd-UL-DL-ConfigurationDedicated or indicated as SBFD symbols or configured with an UL-SB, the UE does not expect to detect a DCI format 2_0 with an SFI-index field value indicating the set of symbols of the slot as uplink/downlink, respectively, or as flexible. Additionally, or alternatively, for a set of symbols of a slot that are indicated as downlink or flexible by tdd-UL-DL-ConfigurationCommon and configured with an UL-SB or configured as SBFD symbols, the UE ignores the indicated SFI-index field values for the set of symbols indicated by the DCI format 2_0. Additionally, or alternatively, for a set of symbols of a slot that are indicated as downlink or flexible by tdd-UL-DL-ConfigurationCommon and configured with UL-SB (e.g., sets of SBFD symbols) or configured as a set of SBFD symbols, the UE does not expect to receive tdd-UL-DL-ConfigurationDedicated indicating the set of symbol as 'uplink' or 'downlink'.

In some examples, a rule may be defined that a parameter (e.g., TDD-UL-DL-ConfigDedicated and SFI in DCI format 2_0 cannot override SBFD symbols configured on F symbols to D or U symbols or add new SBFD symbols.

Figure 5:
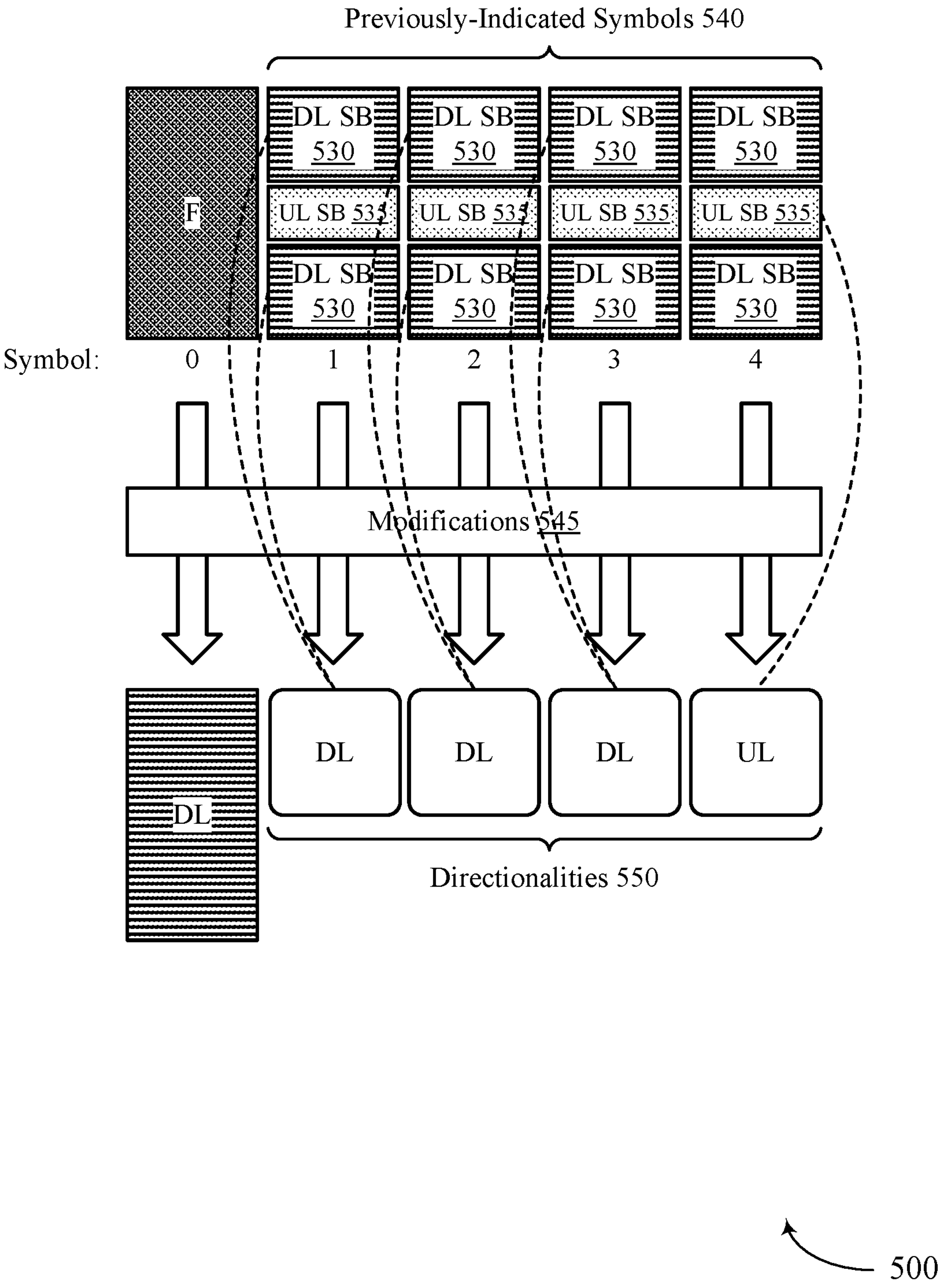
FIG. 5 shows an example of a SBFD scheme that supports user equipment behavior for sub-band full duplex operations in accordance with one or more examples as disclosed herein.

FIG. 5 shows an example of a SBFD scheme 500 that supports user equipment behavior for sub-band full duplex operations in accordance with one or more examples as disclosed herein.

The SBFD scheme 500 depicts a series of symbols (symbol 0, symbol 1, symbol 2, symbol 3, and symbol 4). Among these symbols, symbol 1, symbol 2, symbol 3, and symbol 4 are indicated as the previously-indicated symbols 540. The previously-indicated F symbols 540 are symbols that were indicated as F symbols or D symbols either in the format pattern 240 included in the first control signal 220, in the SBFD format configuration 245 included in the second control signal 225, or both. In some examples, symbol 0 may be a non-SBFD symbol and symbol 1, symbol 2, symbol 3, and symbol 4 may be considered to be SBFD symbols, as they include at least one UL sub-band (e.g., the UL SB 535) and one DL sub-band (e.g., the DL SB 530) that share time resources. The modifications 545 are modifications to the SBFD format configuration 245 included in the second control signal 225 that indicate overrides or other modification of one or more of the symbols. In some examples, the modifications 545 may be included in one or more parameters, such as TDD-UL-DL-ConfigDedicated or TDD-UL-DL-ConfigurationDedicated, an SFI in control signaling such as DCI, including DCI format 2_0, or any combination thereof. In some examples, however, DCI signaling of format 2_0 may not include overrides or indications to change a symbol designated as an SBFD symbol to a non-SBFD symbol.

In some examples, the UE may receive the modifications 545 (e.g., a slot update per slot, a symbol update per symbol, or another time division update per time division) via one or more parameters (e.g., TDD-UL-DL-ConfigDedicated, an SFI in DCI format 2_0, one or more other parameters, or any combination thereof). However, the interpretation of a D or U override in the modifications 545 may be interpreted by the UE to indicate the directionalities 550. The directionalities 550 indicate for the UE to either receive in one or more DL sub-bands of one or more SBFD symbols, to transmit in one or more UL sub-bands of one or more SBFD symbols, or both, that were configured on F symbols or on D symbols (e.g., via the format pattern 240 included in the first control signal 220, the SBFD format configuration 245 included in the second control signal 225, or both). For example, the directionalities 550 associated with symbol 1, symbol 2, and symbol 3, all indicate a DL direction, indicating the UE may communicate or is to communicate in one or more DL SBs 530 in symbol 1, symbol 2, and symbol 3. Further, the directionality 550 associated with symbol 4 indicates an UL direction, indicating the UE may communicate or is to communicate in one or more UL SBs 535 in symbol 4. Thus, the directionalities 550 may have an association with the DL SBs 530, the UL SBs 535, or both. In some examples, the modifications 545 may not include or the UE may not interpret the modifications 545 to indicate a conversion of one or more SBFD symbols to non-SBFD symbols.

In some examples, any UE may interpret the modifications 545 as indicating the directionalities and may perform the associated operations described herein. However, in other examples, such operations may be based on a UE capability to interpret the modifications 545 as indicating the directionalities. In such examples, the UE may transmit an indication of the capability to the network entity and the network entity may transmit the one or more modifications 545 to the UE to be interpreted as the directionalities 550.

Expressed in an alternative manner, if the UE indicates a capability (e.g., SBFD-traffic-direction) and UE is provided by tdd-UL-DL-ConfigurationDedicated for a set of symbols of a slot that are indicated as flexible by tdd-UL-DL-ConfigurationCommon and configured with an UL-SB (e.g., sets of SBFD symbols) or configured as SBFD symbols, the UE determines the set of symbols as "uplink" or "downlink" by tdd-UL-DL-ConfigurationDedicated for directionality. Additionally, or alternatively, for a set of symbols of a slot that are indicated as flexible by tdd-UL-DL-Configuration- Common and configured with an UL-SB or configured as SBFD symbols, if the UE indicates a capability (e.g., SBFD-traffic-direction) and the UE detects DCI format 2_0, the UE determines the sets of symbols of the slot as "uplink" or "downlink" for directionality by the indicated SFI-index field. Additionally, or alternatively, for a set of symbols of a slot that are indicated as downlink by tdd-UL-DL-ConfigurationCommon and configured with an UL-SB or configured as SBFD symbols, if the UE indicates a capability (e.g., SBFD-traffic-direction) and the UE detects DCI format 2_0, the UE determines the sets of symbols of the slot as "uplink" or "downlink" for directionality by the indicated SFI-index field.

Figure 6:
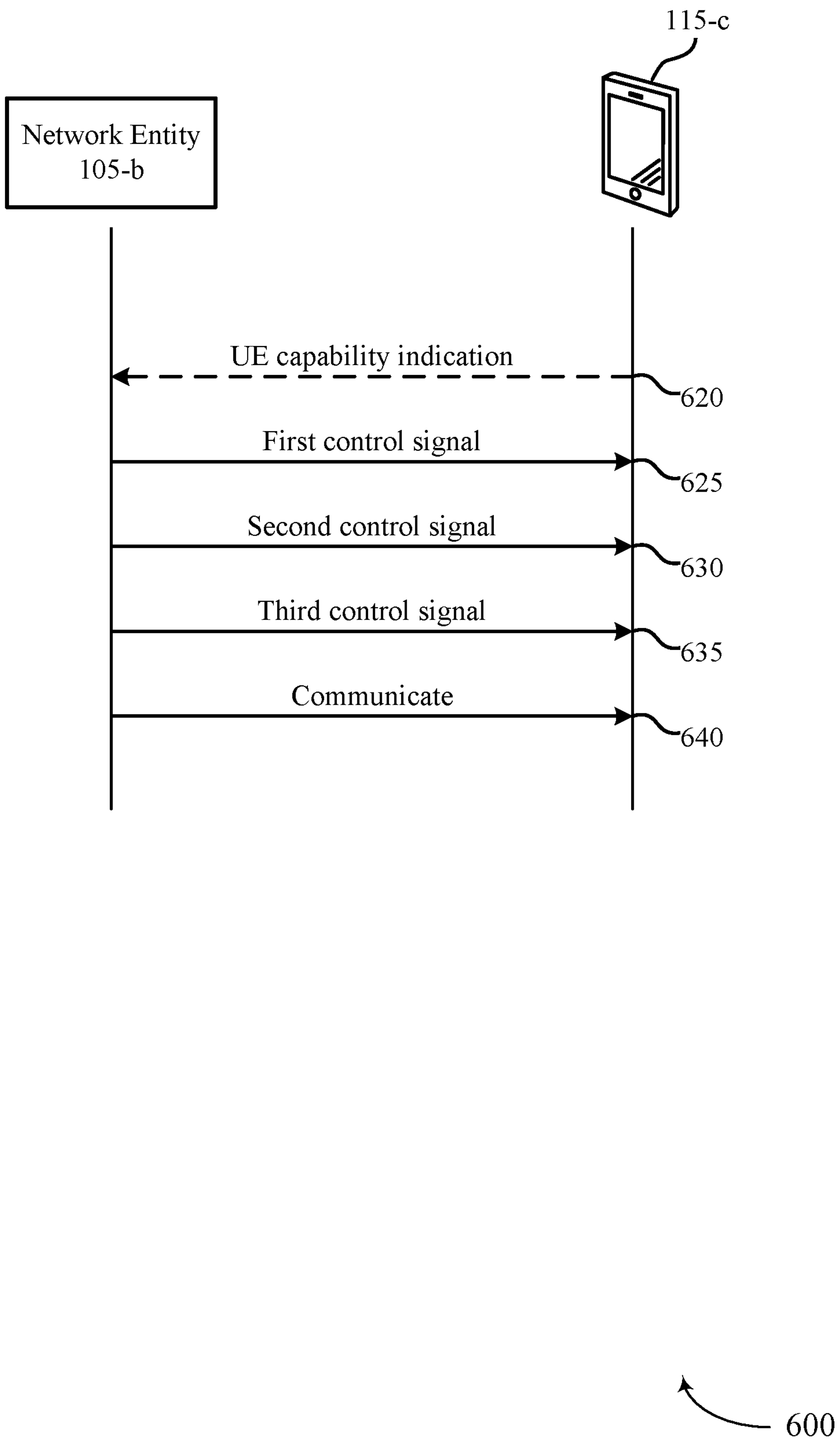
FIG. 6 shows an example of a process flow that supports user equipment behavior for sub-band full duplex operations in accordance with one or more examples as disclosed herein.

FIG. 6 shows an example of a process flow 600 that supports user equipment behavior for sub-band full duplex operations in accordance with one or more examples as disclosed herein. The process flow 600 may implement various aspects of the present disclosure described herein. The elements described in the process flow 600 (e.g., UE 115-*c* and network entity 105-*b*) may be examples of similarly named elements described herein.

In the following description of the process flow 600, the operations between the various entities or elements may be performed in different orders or at different times. Some operations may also be left out of the process flow 600, or other operations may be added. Although the various entities or elements are shown performing the operations of the process flow 600, some aspects of some operations may also be performed by other entities or elements of the process flow 600 or by entities or elements that are not depicted in the process flow, or any combination thereof.

At 620, the UE 115-*c* may transmit an indication of a capability of the UE to determine the respective communication directionalities and the respective communication directionalities are determined based on the capability of the UE.

At 625, the UE 115-*c* may receive a first control signal that may indicate a format pattern for a plurality of symbols.

At 630, the UE 115-*c* may receive a second control signal that may indicate that a sub-band full duplex (SBFD) format configuration for the plurality of symbols and one or more first symbols of the plurality of symbols are configured as SBFD symbols, where one or more second symbols different than the one or more first symbols are configured as non-SBFD symbols. In some examples, the second control signal may indicate a UE-common configuration parameter.

At 635, the UE 115-*c* may receive a third control signal that may indicate one or more modifications to the SBFD format configuration for the one or more first symbols, the one or more second symbols, or both. In some examples, the third control signal is group-common downlink control information signaling that includes a slot format indicator field or radio resource control signaling that includes a UE-dedicated slot format configuration. In some examples, a format of the group-common downlink control information signaling is a group-common downlink control information format 2_0 or a group-common downlink control information format 2_x.

At 640, the UE 115-*c* may communicate in accordance with the first control signal, the second control signal, the third control signal, and an SBFD interpretation rule associated with the one or more modifications to the SBFD format configuration.

In some examples, to communicate in accordance with the first control signal, the second control signal, the third control signal, and the SBFD interpretation rule, the UE 115-*c* may disregard, in accordance with the SBFD interpretation rule, one or more first modifications of the one or more modifications indicated as overriding one or more configurations of the one or more first symbols. In some examples, to communicate in accordance with the first control signal, the second control signal, the third control signal, and the SBFD interpretation rule, the UE 115-*c* may apply, to the SBFD format configuration in accordance with the SBFD interpretation rule, one or more second modifications of the one or more modifications indicated as overriding one or more configurations of the one or more second symbols. In some examples, to disregard the one or more first modifications, the UE 115-*c* may disregard modification of a flexible symbol configured with an uplink sub-band or configured as a SBFD symbol to a downlink symbol or an uplink symbol, disregarding modification of a non-SBFD symbol to a SBFD symbol, or both.

In some examples, to communicate in accordance with the first control signal, the second control signal, the third control signal, and the SBFD interpretation rule, the UE 115-*c* may disregard, in accordance with the SBFD interpretation rule, one or more first modifications of the one or more modifications indicated as overriding one or more configurations of the one or more first symbols. In some examples, to communicate in accordance with the first control signal, the second control signal, the third control signal, and the SBFD interpretation rule, the UE 115-*c* may disregard, in accordance with the SBFD interpretation rule, one or more second modifications of the one or more modifications indicated as overriding one or more configurations of the one or more second symbols.

In some examples, to communicate in accordance with the first control signal, the second control signal, the third control signal, and the SBFD interpretation rule, the UE 115-*c* may determine, based on one or more first modifications of the one or more modifications indicated as overriding one or more configurations of at least one of the one or more first symbols as flexible symbols, respective communication directionalities associated with symbols indicated in the one or more first modifications and the respective communication directionalities indicate uplink transmissions to be communicated in uplink sub-bands of the one or more first symbols, downlink transmissions to be communicated in downlink sub-bands of the one or more first symbols, or any combination thereof. In some examples, to communicate in accordance with the first control signal, the second control signal, the third control signal, and the SBFD interpretation rule, the UE 115-*c* may communicate one or more transmissions in accordance with the determined respective communication directionalities in one or more uplink sub-bands, one or more downlink sub-bands, or both, that are associated with the symbols indicated in the one or more first modifications. In some examples, to communicate in accordance with the first control signal, the second control signal, the third control signal, and the SBFD interpretation rule, the UE 115-*c* may apply, to the SBFD format configuration in accordance with the SBFD interpretation rule, one or more second modifications of the one or more modifications indicated as overriding one or more configurations of the one or more second symbols.

In some examples, to communicate in accordance with the first control signal, the second control signal, the third control signal, and the SBFD interpretation rule, the UE 115-*c* may determine, based on one or more first modifications of the one or more modifications indicated as overriding one or more configurations of at least one of the one or more first symbols as flexible symbols, respective communication directionalities associated with symbols indicated in the one or more first modifications and the respective communication directionalities indicate uplink transmissions to be communicated in uplink sub-bands of the one or more first symbols, downlink transmissions to be communicated in downlink sub-bands of the one or more first symbols, or any combination thereof. In some examples, to communicate in accordance with the first control signal, the second control signal, the third control signal, and the SBFD interpretation rule, the UE 115-*c* may communicate one or more transmissions in accordance with the determined respective communication directionalities in one or more uplink sub-bands, one or more downlink sub-bands, or both, that are associated with the symbols indicated in the one or more first modifications. In some examples, to communicate in accordance with the first control signal, the second control signal, the third control signal, and the SBFD interpretation rule, the UE 115-*c* may apply, to the SBFD format configuration in accordance with the SBFD interpretation rule, one or more second modifications of the one or more modifications indicated as overriding one or more configurations of the one or more second symbols.

Figure 7:
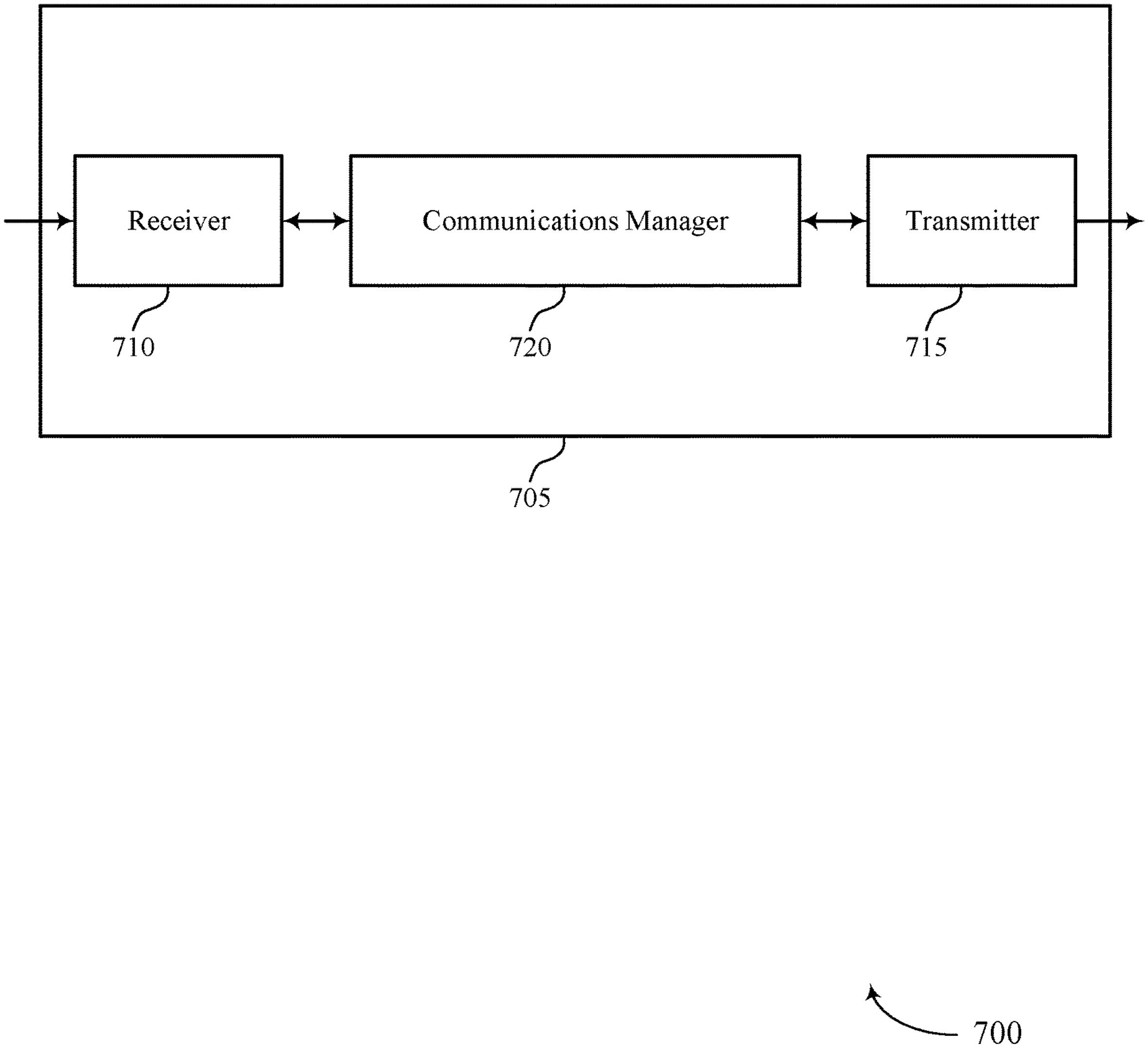
FIGS. 7 and 8 show block diagrams of devices that support user equipment behavior for sub-band full duplex operations in accordance with one or more examples as disclosed herein.

FIG. 7 shows a block diagram 700 of a device 705 that supports user equipment behavior for sub-band full duplex operations in accordance with one or more examples as disclosed herein. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to user equipment behavior for sub-band full duplex operations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to user equipment behavior for sub-band full duplex operations). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations or components thereof may be examples of means for performing various aspects of user equipment behavior for sub-band full duplex operations as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

Additionally, or alternatively, the communications manager 720 may support wireless communications in accordance with examples as disclosed herein. For example, the communications manager 720 is capable of, configured to, or operable to support a means for receiving a first control signal indicating a format pattern for a set of multiple symbols. The communications manager 720 is capable of, configured to, or operable to support a means for receiving a second control signal indicating a sub-band full duplex (SBFD) format configuration for the set of multiple symbols, where one or more first symbols of the set of multiple symbols are configured as SBFD symbols, and where one or more second symbols different than the one or more first symbols are configured as non-SBFD symbols. The communications manager 720 is capable of, configured to, or operable to support a means for receiving a third control signal indicating one or more modifications to the SBFD format configuration for the one or more first symbols, the one or more second symbols, or both. The communications manager 720 is capable of, configured to, or operable to support a means for communicating in accordance with the first control signal, the second control signal, the third control signal, and an SBFD interpretation rule associated with the one or more modifications to the SBFD format configuration.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced processing, reduced power consumption, more efficient utilization of communication resources, or any combination thereof.

Figure 8:
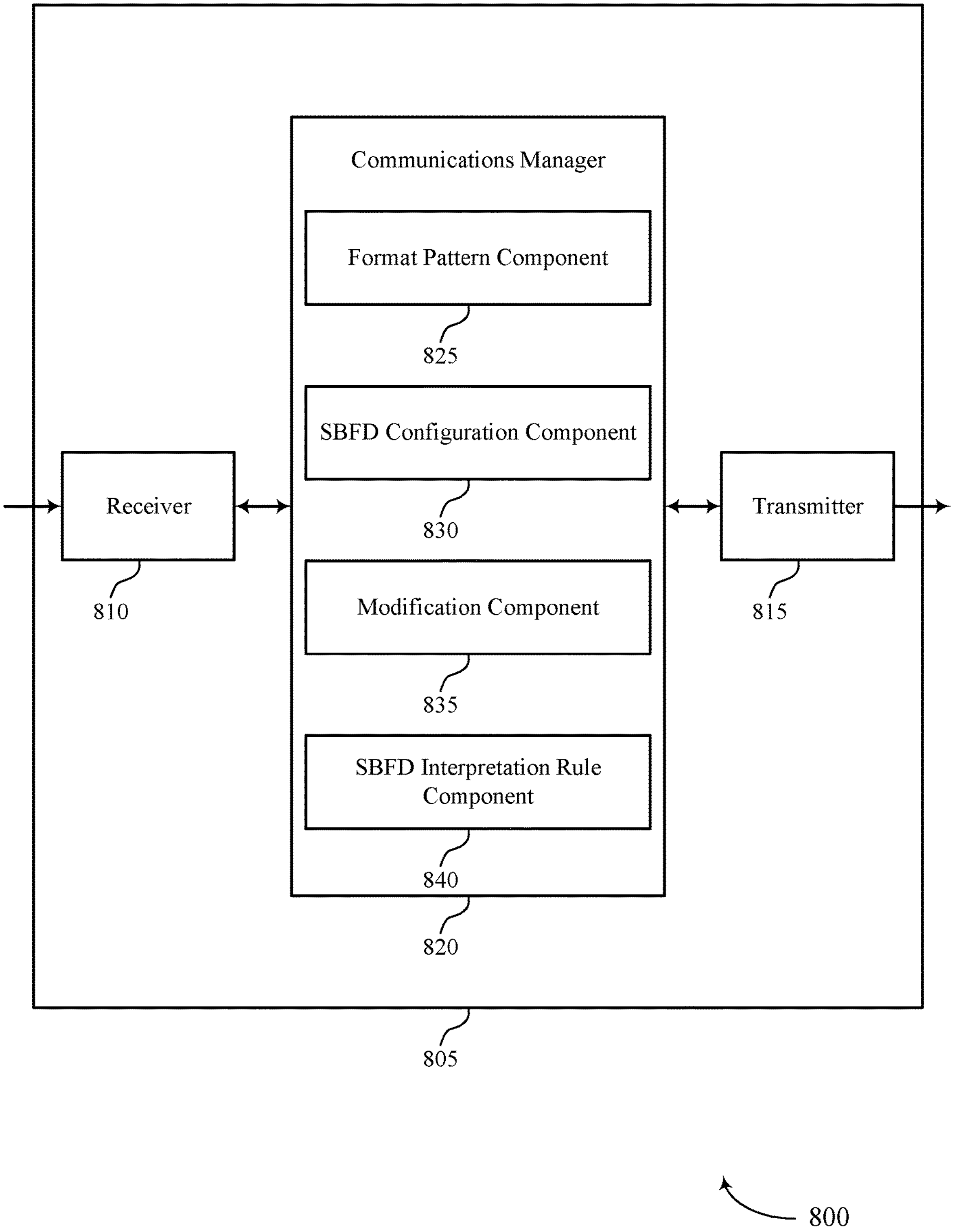

FIG. 8 shows a block diagram 800 of a device 805 that supports user equipment behavior for sub-band full duplex operations in accordance with one or more examples as disclosed herein. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to user equipment behavior for sub-band full duplex operations). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to user equipment behavior for sub-band full duplex operations). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of user equipment behavior for sub-band full duplex operations as described herein. For example, the communications manager 820 may include a format pattern component 825, an SBFD configuration component 830, a modification component 835, an SBFD interpretation rule component 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The format pattern component 825 is capable of, configured to, or operable to support a means for receiving a first control signal indicating a format pattern for a set of multiple symbols. The SBFD configuration component 830 is capable of, configured to, or operable to support a means for receiving a second control signal indicating a sub-band full duplex (SBFD) format configuration for the set of multiple symbols, where one or more first symbols of the set of multiple symbols are configured as SBFD symbols, and where one or more second symbols different than the one or more first symbols are configured as non-SBFD symbols. The modification component 835 is capable of, configured to, or operable to support a means for receiving a third control signal indicating one or more modifications to the SBFD format configuration for the one or more first symbols, the one or more second symbols, or both. The SBFD interpretation rule component 840 is capable of, configured to, or operable to support a means for communicating in accordance with the first control signal, the second control signal, the third control signal, and an SBFD interpretation rule associated with the one or more modifications to the SBFD format configuration.

Figure 9:
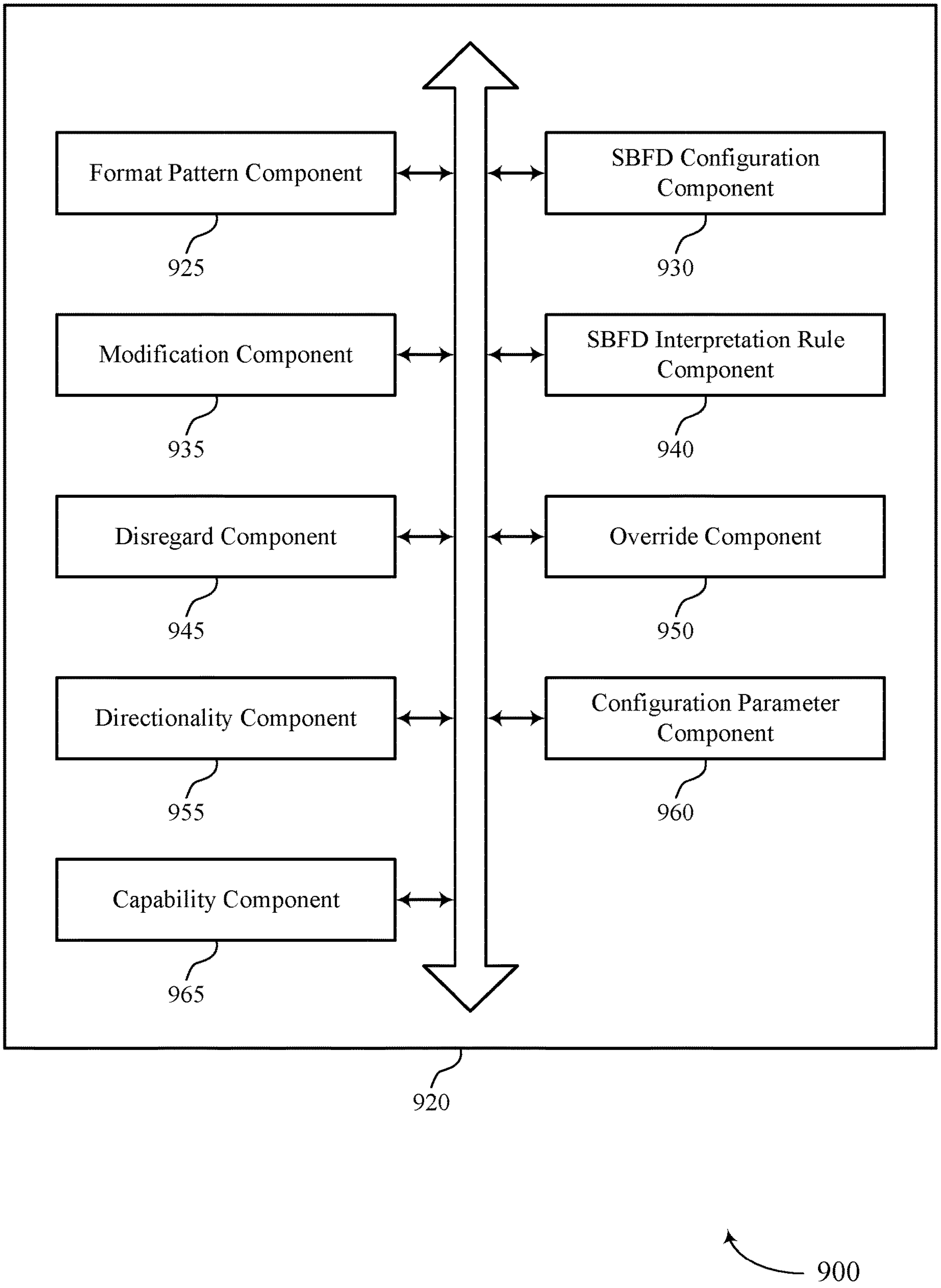
FIG. 9 shows a block diagram of a communications manager that supports user equipment behavior for sub-band full duplex operations in accordance with one or more examples as disclosed herein.

FIG. 9 shows a block diagram 900 of a communications manager 920 that supports user equipment behavior for sub-band full duplex operations in accordance with one or more examples as disclosed herein. The communications manager 920 may be an example of aspects of a communications manager 720, a communications manager 820, or both, as described herein. The communications manager 920, or various components thereof, may be an example of means for performing various aspects of user equipment behavior for sub-band full duplex operations as described herein. For example, the communications manager 920 may include a format pattern component 925, an SBFD configuration component 930, a modification component 935, an SBFD interpretation rule component 940, a disregard component 945, an override component 950, a directionality component 955, a configuration parameter component 960, a capability component 965, or any combination thereof. Each of these components, or components or subcomponents thereof (e.g., one or more processors, one or more memories), may communicate, directly or indirectly, with one another (e.g., via one or more buses).

Additionally, or alternatively, the communications manager 920 may support wireless communications in accordance with examples as disclosed herein. The format pattern component 925 is capable of, configured to, or operable to support a means for receiving a first control signal indicating a format pattern for a set of multiple symbols. The SBFD configuration component 930 is capable of, configured to, or operable to support a means for receiving a second control signal indicating a sub-band full duplex (SBFD) format configuration for the set of multiple symbols, where one or more first symbols of the set of multiple symbols are configured as SBFD symbols, and where one or more second symbols different than the one or more first symbols are configured as non-SBFD symbols. The modification component 935 is capable of, configured to, or operable to support a means for receiving a third control signal indicating one or more modifications to the SBFD format configuration for the one or more first symbols, the one or more second symbols, or both. The SBFD interpretation rule component 940 is capable of, configured to, or operable to support a means for communicating in accordance with the first control signal, the second control signal, the third control signal, and an SBFD interpretation rule associated with the one or more modifications to the SBFD format configuration.

In some examples, to support communicating in accordance with the first control signal, the second control signal, the third control signal, and the SBFD interpretation rule, the disregard component 945 is capable of, configured to, or operable to support a means for disregarding, in accordance with the SBFD interpretation rule, one or more first modifications of the one or more modifications indicated as overriding one or more configurations of the one or more first symbols. In some examples, to support communicating in accordance with the first control signal, the second control signal, the third control signal, and the SBFD interpretation rule, the override component 950 is capable of, configured to, or operable to support a means for applying, to the SBFD format configuration in accordance with the SBFD interpretation rule, one or more second modifications of the one or more modifications indicated as overriding one or more configurations of the one or more second symbols.

In some examples, to support disregarding the one or more first modifications, the disregard component 945 is capable of, configured to, or operable to support a means for disregarding modification of a flexible symbol configured with an uplink sub-band or configured as a SBFD symbol to a downlink symbol or an uplink symbol, disregarding modification of a non-SBFD symbol to a SBFD symbol, or both.

In some examples, to support communicating in accordance with the first control signal, the second control signal, the third control signal, and the SBFD interpretation rule, the disregard component 945 is capable of, configured to, or operable to support a means for disregarding, in accordance with the SBFD interpretation rule, one or more first modifications of the one or more modifications indicated as overriding one or more configurations of the one or more first symbols. In some examples, to support communicating in accordance with the first control signal, the second control signal, the third control signal, and the SBFD interpretation rule, the disregard component 945 is capable of, configured to, or operable to support a means for disregarding, in accordance with the SBFD interpretation rule, one or more second modifications of the one or more modifications indicated as overriding one or more configurations of the one or more second symbols.

In some examples, to support communicating in accordance with the first control signal, the second control signal, the third control signal, and the SBFD interpretation rule, the directionality component 955 is capable of, configured to, or operable to support a means for determining, based on one or more first modifications of the one or more modifications indicated as overriding one or more configurations of at least one of the one or more first symbols as flexible symbols, respective communication directionalities associated with symbols indicated in the one or more first modifications, where the respective communication directionalities indicate uplink transmissions to be communicated in uplink sub-bands of the one or more first symbols, downlink transmissions to be communicated in downlink sub-bands of the one or more first symbols, or any combination thereof. In some examples, to support communicating in accordance with the first control signal, the second control signal, the third control signal, and the SBFD interpretation rule, the directionality component 955 is capable of, configured to, or operable to support a means for communicating one or more transmissions in accordance with the determined respective communication directionalities in one or more uplink sub-bands, one or more downlink sub-bands, or both, that are associated with the symbols indicated in the one or more first modifications.

In some examples, to support communicating in accordance with the first control signal, the second control signal, the third control signal, and the SBFD interpretation rule, the override component 950 is capable of, configured to, or operable to support a means for applying, to the SBFD format configuration in accordance with the SBFD interpretation rule, one or more second modifications of the one or more modifications indicated as overriding one or more configurations of the one or more second symbols.

In some examples, the capability component 965 is capable of, configured to, or operable to support a means for transmitting an indication of a capability of the UE to determine the respective communication directionalities, where the respective communication directionalities are determined based on the capability of the UE.

In some examples, to support communicating in accordance with the first control signal, the second control signal, the third control signal, and the SBFD interpretation rule, the directionality component 955 is capable of, configured to, or operable to support a means for determining, based on one or more first modifications of the one or more modifications indicated as overriding one or more configurations of at least one of the one or more first symbols as flexible symbols, respective communication directionalities associated with symbols indicated in the one or more first modifications, where the respective communication directionalities indicate uplink transmissions to be communicated in uplink sub-bands of the one or more first symbols, downlink transmissions to be communicated in downlink sub-bands of the one or more first symbols, or any combination thereof. In some examples, to support communicating in accordance with the first control signal, the second control signal, the third control signal, and the SBFD interpretation rule, the directionality component 955 is capable of, configured to, or operable to support a means for communicating one or more transmissions in accordance with the determined respective communication directionalities in one or more uplink sub-bands, one or more downlink sub-bands, or both, that are associated with the symbols indicated in the one or more first modifications.

In some examples, to support communicating in accordance with the first control signal, the second control signal, the third control signal, and the SBFD interpretation rule, the override component 950 is capable of, configured to, or operable to support a means for applying, to the SBFD format configuration in accordance with the SBFD interpretation rule, one or more second modifications of the one or more modifications indicated as overriding one or more configurations of the one or more second symbols.

In some examples, the capability component 965 is capable of, configured to, or operable to support a means for transmitting an indication of a capability of the UE to determine the respective communication directionalities, where the respective communication directionalities are determined based on the capability of the UE.

In some examples, the second control signal indicates a UE-common configuration parameter. In some examples, the third control signal includes group-common downlink control information signaling that includes a slot format indicator field or radio resource control signaling that includes a UE-dedicated slot format configuration.

In some examples, a format of the group-common downlink control information signaling is a group-common downlink control information format 2_0 or a group-common downlink control information format 2_x.

Figure 10:
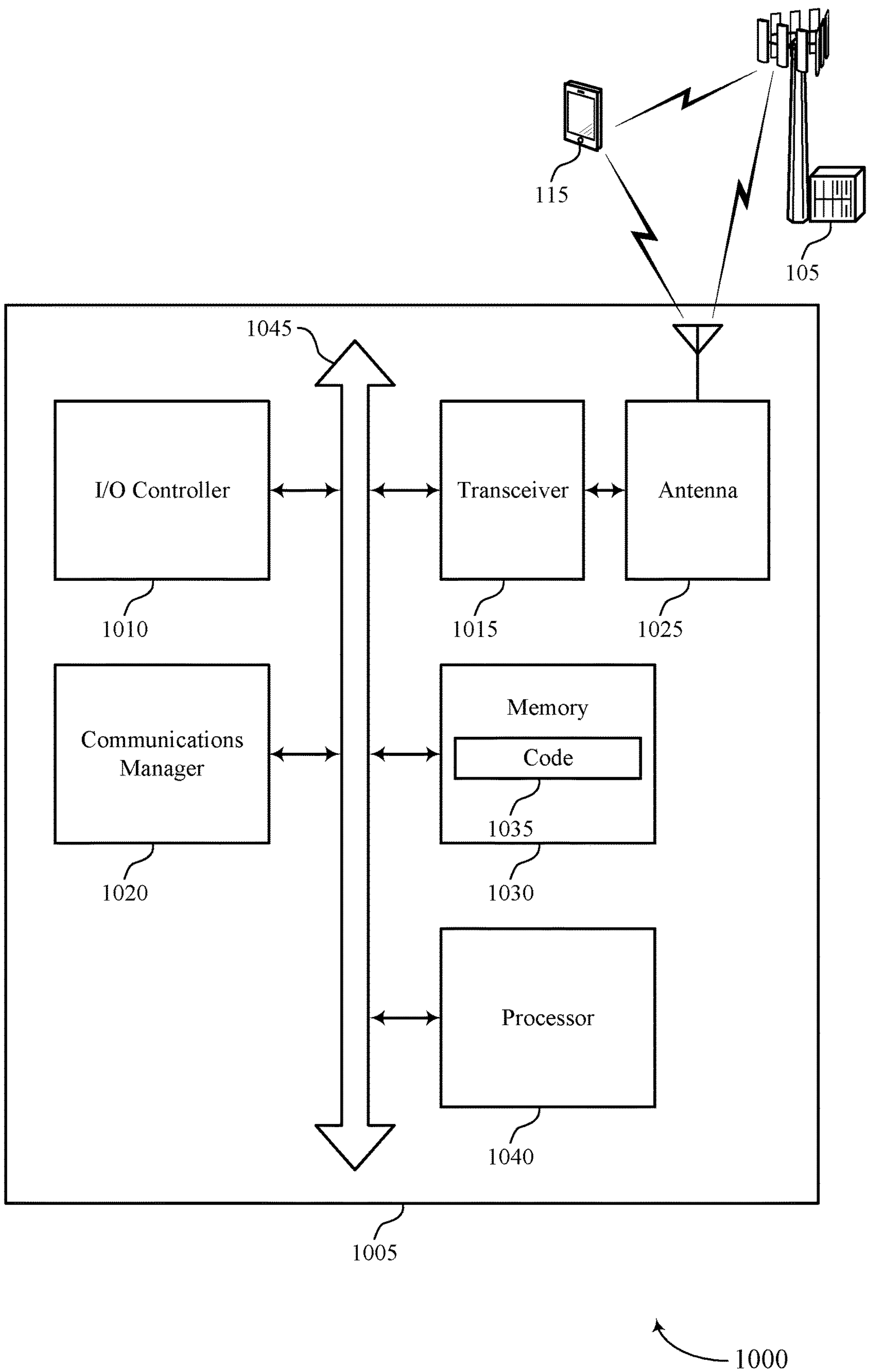
FIG. 10 shows a diagram of a system including a device that supports user equipment behavior for sub-band full duplex operations in accordance with one or more examples as disclosed herein.

FIG. 10 shows a diagram of a system 1000 including a device 1005 that supports user equipment behavior for sub-band full duplex operations in accordance with one or more examples as disclosed herein. The device 1005 may be an example of or include components of a device 705, a device 805, or a UE 115 as described herein. The device 1005 may communicate (e.g., wirelessly) with one or more other devices (e.g., network entities 105, UEs 115, or a combination thereof). The device 1005 may include components for bi-directional voice and data communications including components for transmitting and receiving communications, such as a communications manager 1020, an input/output (I/O) controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a basic I/O system (BIOS) which may control basic hardware or software operation such as the interaction with peripheral components or devices.

The at least one processor 1040 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting user equipment behavior for sub-band full duplex operations). For example, the device 1005 or a component of the device 1005 may include at least one processor 1040 and at least one memory 1030 coupled with or to the at least one processor 1040, the at least one processor 1040 and the at least one memory 1030 configured to perform various functions described herein.

In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

Additionally, or alternatively, the communications manager 1020 may support wireless communications in accordance with examples as disclosed herein. For example, the communications manager 1020 is capable of, configured to, or operable to support a means for receiving a first control signal indicating a format pattern for a set of multiple symbols. The communications manager 1020 is capable of, configured to, or operable to support a means for receiving a second control signal indicating a sub-band full duplex (SBFD) format configuration for the set of multiple symbols, where one or more first symbols of the set of multiple symbols are configured as SBFD symbols, and where one or more second symbols different than the one or more first symbols are configured as non-SBFD symbols. The communications manager 1020 is capable of, configured to, or operable to support a means for receiving a third control signal indicating one or more modifications to the SBFD format configuration for the one or more first symbols, the one or more second symbols, or both. The communications manager 1020 is capable of, configured to, or operable to support a means for communicating in accordance with the first control signal, the second control signal, the third control signal, and an SBFD interpretation rule associated with the one or more modifications to the SBFD format configuration.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of user equipment behavior for sub-band full duplex operations as described herein, or the at least one processor 1040 and the at least one memory 1030 may be otherwise configured to, individually or collectively, perform or support such operations.

Figure 11:
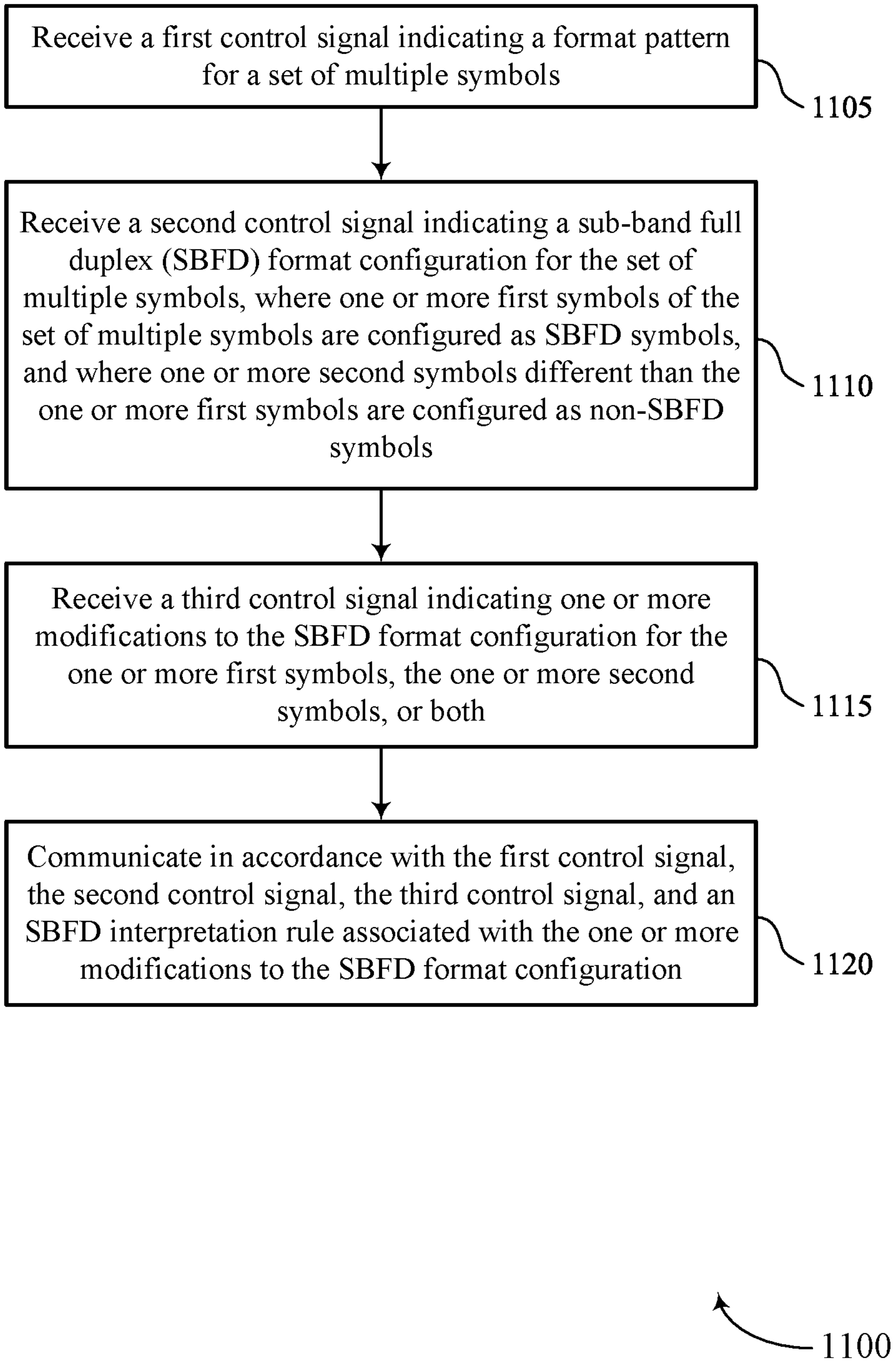
FIG. 11 shows a flowchart illustrating methods that support user equipment behavior for sub-band full duplex operations in accordance with one or more examples as disclosed herein.

FIG. 11 shows a flowchart illustrating a method 1100 that supports user equipment behavior for sub-band full duplex operations in accordance with one or more examples as disclosed herein. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving a first control signal indicating a format pattern for a set of multiple symbols. The operations of 1105 may be performed in accordance with examples as disclosed herein. In some examples, aspects of the operations of 1105 may be performed by a format pattern component 925 as described with reference to FIG. 9.

At 1110, the method may include receiving a second control signal indicating a sub-band full duplex (SBFD) format configuration for the set of multiple symbols, where one or more first symbols of the set of multiple symbols are configured as SBFD symbols, and where one or more second symbols different than the one or more first symbols are configured as non-SBFD symbols. The operations of 1110 may be performed in accordance with examples as disclosed herein. In some examples, aspects of the operations of 1110 may be performed by an SBFD configuration component 930 as described with reference to FIG. 9.

At 1115, the method may include receiving a third control signal indicating one or more modifications to the SBFD format configuration for the one or more first symbols, the one or more second symbols, or both. The operations of 1115 may be performed in accordance with examples as disclosed herein. In some examples, aspects of the operations of 1115 may be performed by a modification component 935 as described with reference to FIG. 9.

At 1120, the method may include communicating in accordance with the first control signal, the second control signal, the third control signal, and an SBFD interpretation rule associated with the one or more modifications to the SBFD format configuration. The operations of 1120 may be performed in accordance with examples as disclosed herein. In some examples, aspects of the operations of 1120 may be performed by an SBFD interpretation rule component 940 as described with reference to FIG. 9.

The following provides an overview of aspects of the present disclosure:

Aspect 1: A method for wireless communications at a UE, comprising: receiving a first control signal indicating a format pattern for a plurality of symbols; receiving a second control signal indicating a sub-band full duplex (SBFD) format configuration for the plurality of symbols, wherein one or more first symbols of the plurality of symbols are configured as SBFD symbols, and wherein one or more second symbols different than the one or more first symbols are configured as non-SBFD symbols; receiving a third control signal indicating one or more modifications to the SBFD format configuration for the one or more first symbols, the one or more second symbols, or both; and communicating in accordance with the first control signal, the second control signal, the third control signal, and an SBFD interpretation rule associated with the one or more modifications to the SBFD format configuration.

Aspect 2: The method of aspect 1, wherein communicating in accordance with the first control signal, the second control signal, the third control signal, and the SBFD interpretation rule comprises: disregarding, in accordance with the SBFD interpretation rule, one or more first modifications of the one or more modifications indicated as overriding one or more configurations of the one or more first symbols; and applying, to the SBFD format configuration in accordance with the SBFD interpretation rule, one or more second modifications of the one or more modifications indicated as overriding one or more configurations of the one or more second symbols.

Aspect 3: The method of aspect 2, wherein disregarding the one or more first modifications comprises: disregarding modification of a flexible symbol configured with an uplink subband or configured as a SBFD symbol to a downlink symbol or an uplink symbol, disregarding modification of a non-SBFD symbol to a SBFD symbol, or both.

Aspect 4: The method of any of aspects 1 through 3, wherein communicating in accordance with the first control signal, the second control signal, the third control signal, and the SBFD interpretation rule comprises: disregarding, in accordance with the SBFD interpretation rule, one or more first modifications of the one or more modifications indicated as overriding one or more configurations of the one or more first symbols; and disregarding, in accordance with the SBFD interpretation rule, one or more second modifications of the one or more modifications indicated as overriding one or more configurations of the one or more second symbols.

Aspect 5: The method of any of aspects 1 through 4, wherein communicating in accordance with the first control signal, the second control signal, the third control signal, and the SBFD interpretation rule comprises: determining, based at least in part on one or more first modifications of the one or more modifications indicated as overriding one or more configurations of at least one of the one or more first symbols as flexible symbols, respective communication directionalities associated with symbols indicated in the one or more first modifications, wherein the respective communication directionalities indicate uplink transmissions to be communicated in uplink sub-bands of the one or more first symbols, downlink transmissions to be communicated in downlink sub-bands of the one or more first symbols, or any combination thereof; and communicating one or more transmissions in accordance with the determined respective communication directionalities in one or more uplink sub-bands, one or more downlink sub-bands, or both, that are associated with the symbols indicated in the one or more first modifications.

Aspect 6: The method of aspect 5, wherein communicating in accordance with the first control signal, the second control signal, the third control signal, and the SBFD interpretation rule comprises: applying, to the SBFD format configuration in accordance with the SBFD interpretation rule, one or more second modifications of the one or more modifications indicated as overriding one or more configurations of the one or more second symbols.

Aspect 7: The method of any of aspects 5 through 6, further comprising: transmitting an indication of a capability of the UE to determine the respective communication directionalities, wherein the respective communication directionalities are determined based at least in part on the capability of the UE.

Aspect 8: The method of any of aspects 1 through 7, wherein communicating in accordance with the first control signal, the second control signal, the third control signal, and the SBFD interpretation rule comprises: determining, based at least in part on one or more first modifications of the one or more modifications indicated as overriding one or more configurations of at least one of the one or more first symbols as flexible symbols, respective communication directionalities associated with symbols indicated in the one or more first modifications, wherein the respective communication directionalities indicate uplink transmissions to be communicated in uplink sub-bands of the one or more first symbols, downlink transmissions to be communicated in downlink sub-bands of the one or more first symbols, or any combination thereof; and communicating one or more transmissions in accordance with the determined respective communication directionalities in one or more uplink sub-bands, one or more downlink sub-bands, or both, that are associated with the symbols indicated in the one or more first modifications.

Aspect 9: The method of aspect 8, wherein communicating in accordance with the first control signal, the second control signal, the third control signal, and the SBFD interpretation rule comprises: applying, to the SBFD format configuration in accordance with the SBFD interpretation rule, one or more second modifications of the one or more modifications indicated as overriding one or more configurations of the one or more second symbols.

Aspect 10: The method of any of aspects 8 through 9, further comprising: transmitting an indication of a capability of the UE to determine the respective communication directionalities, wherein the respective communication directionalities are determined based at least in part on the capability of the UE.

Aspect 11: The method of any of aspects 1 through 10, wherein the second control signal indicates a UE-common configuration parameter; and the third control signal comprises group-common downlink control information signaling that comprises a slot format indicator field or radio resource control signaling that comprises a UE-dedicated slot format configuration.

Aspect 12: The method of aspect 11, wherein a format of the group-common downlink control information signaling is a group-common downlink control information format 2_0 or a group-common downlink control information format 2_x.

Aspect 13: A UE for wireless communications, comprising one or more memories storing processor-executable code, and one or more processors coupled with the one or more memories and individually or collectively operable to execute the code to cause the UE to perform a method of any of aspects 1 through 12.

Aspect 14: A UE for wireless communications, comprising at least one means for performing a method of any of aspects 1 through 12.

Aspect 15: A non-transitory computer-readable medium storing code for wireless communications, the code comprising instructions executable by one or more processors to perform a method of any of aspects 1 through 12.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

at least one processor; and at least one memory coupled with the at least one processor, with instructions stored in the at least one memory, the instructions being executable by the at least one processor, individually or in any combination, to cause the UE to:

receive a first control signal indicating a format pattern for a plurality of symbols;

receive a second control signal indicating a sub-band full duplex (SBFD) format configuration for the plurality of symbols, wherein one or more first symbols of the plurality of symbols are configured as SBFD symbols, and wherein one or more second symbols different than the one or more first symbols are configured as non-SBFD symbols;

receive a third control signal indicating one or more modifications to the SBFD format configuration for the one or more first symbols, the one or more second symbols, or both; and communicate in accordance with the first control signal, the second control signal, the third control signal, and an SBFD interpretation rule associated with the one or more modifications to the SBFD format configuration, wherein the SBFD interpretation rule indicates that the UE is to disregard one or more first modifications of the one or more modifications, the one or more first modification indicated by the third control signal as overriding one or more configurations of the one or more first symbols.

2. The UE of claim 1, wherein, to communicate in accordance with the first control signal, the second control signal, the third control signal, and the SBFD interpretation rule, the instructions are executable by the at least one processor, individually or in any combination, to cause the UE to:

apply, to the SBFD format configuration in accordance with the SBFD interpretation rule, one or more second modifications of the one or more modifications indicated as overriding one or more configurations of the one or more second symbols.

3. The UE of claim 2, wherein, to disregard the one or more first modifications, the instructions are executable by the at least one processor, individually or in any combination, to cause the UE to:

disregard modification of a flexible symbol configured with an uplink sub-band or configured as a SBFD symbol to a downlink symbol or an uplink symbol, disregarding modification of a non-SBFD symbol to a SBFD symbol, or both.

4. The UE of claim 1, wherein, to communicate in accordance with the first control signal, the second control signal, the third control signal, and the SBFD interpretation rule, the instructions are executable by the at least one processor, individually or in any combination, to cause the UE to:

disregard, in accordance with the SBFD interpretation rule, one or more second modifications of the one or more modifications indicated as overriding one or more configurations of the one or more second symbols.

5. The UE of claim 1, wherein, to communicate in accordance with the first control signal, the second control signal, the third control signal, and the SBFD interpretation rule, the instructions are executable by the at least one processor, individually or in any combination, to cause the UE to:

determine, based at least in part on one or more first modifications of the one or more modifications indicated as overriding one or more configurations of at least one of the one or more first symbols as flexible symbols, respective communication directionalities associated with symbols indicated in the one or more first modifications, wherein the respective communication directionalities indicate uplink transmissions to be communicated in uplink sub-bands of the one or more first symbols, downlink transmissions to be communicated in downlink sub-bands of the one or more first symbols, or any combination thereof; and communicate one or more transmissions in accordance with the determined respective communication directionalities in one or more uplink sub-bands, one or more downlink sub-bands, or both, that are associated with the symbols indicated in the one or more first modifications.

6. The UE of claim 5, wherein, to communicate in accordance with the first control signal, the second control signal, the third control signal, and the SBFD interpretation rule, the instructions are executable by the at least one processor, individually or in any combination, to cause the UE to:

apply, to the SBFD format configuration in accordance with the SBFD interpretation rule, one or more second modifications of the one or more modifications indicated as overriding one or more configurations of the one or more second symbols.

7. The UE of claim 5, wherein the instructions are executable by the at least one processor, individually or in any combination, to cause the UE to:

transmit an indication of a capability of the UE to determine the respective communication directionalities, wherein the respective communication directionalities are determined based at least in part on the capability of the UE.

8. The UE of claim 1, wherein, to communicate in accordance with the first control signal, the second control signal, the third control signal, and the SBFD interpretation rule, the instructions are executable by the at least one processor, individually or in any combination, to cause the UE to:

determine, based at least in part on one or more first modifications of the one or more modifications indicated as overriding one or more configurations of at least one of the one or more first symbols as flexible symbols, respective communication directionalities associated with symbols indicated in the one or more first modifications, wherein the respective communication directionalities indicate uplink transmissions to be communicated in uplink sub-bands of the one or more first symbols, downlink transmissions to be communicated in downlink sub-bands of the one or more first symbols, or any combination thereof; and communicate one or more transmissions in accordance with the determined respective communication directionalities in one or more uplink sub-bands, one or more downlink sub-bands, or both, that are associated with the symbols indicated in the one or more first modifications.

9. The UE of claim 8, wherein, to communicate in accordance with the first control signal, the second control signal, the third control signal, and the SBFD interpretation rule, the instructions are executable by the at least one processor, individually or in any combination, to cause the UE to:

apply, to the SBFD format configuration in accordance with the SBFD interpretation rule, one or more second modifications of the one or more modifications indicated as overriding one or more configurations of the one or more second symbols.

10. The UE of claim 8, wherein the instructions are executable by the at least one processor, individually or in any combination, to cause the UE to:

transmit an indication of a capability of the UE to determine the respective communication directionalities, wherein the respective communication directionalities are determined based at least in part on the capability of the UE.

11. The UE of claim 1, wherein:

the second control signal indicates a UE-common configuration parameter; and the third control signal comprises group-common downlink control information signaling that comprises a slot format indicator field or radio resource control signaling that comprises a UE-dedicated slot format configuration.

12. The UE of claim 1, wherein a format of the group-common downlink control information signaling is a group-common downlink control information format 2_0 or a group-common downlink control information format 2_x.

13. A method for wireless communications at a user equipment (UE), comprising:

receiving a first control signal indicating a format pattern for a plurality of symbols;

receiving a second control signal indicating a sub-band full duplex (SBFD) format configuration for the plurality of symbols, wherein one or more first symbols of the plurality of symbols are configured as SBFD symbols, and wherein one or more second symbols different than the one or more first symbols are configured as non-SBFD symbols;

receiving a third control signal indicating one or more modifications to the SBFD format configuration for the one or more first symbols, the one or more second symbols, or both; and communicating in accordance with the first control signal, the second control signal, the third control signal, and an SBFD interpretation rule associated with the one or more modifications to the SBFD format configuration, wherein the SBFD interpretation rule indicates that the UE is to disregard one or more first modifications of the one or more modifications, the one or more first modification indicated by the third control signal as overriding one or more configurations of the one or more first symbols.

14. The method of claim 13, wherein communicating in accordance with the first control signal, the second control signal, the third control signal, and the SBFD interpretation rule comprises:

applying, to the SBFD format configuration in accordance with the SBFD interpretation rule, one or more second modifications of the one or more modifications indicated as overriding one or more configurations of the one or more second symbols.

15. The method of claim 14, wherein disregarding the one or more first modifications comprises:

disregarding modification of a flexible symbol configured with an uplink sub-band or configured as a SBFD symbol to a downlink symbol or an uplink symbol, disregarding modification of a non-SBFD symbol to a SBFD symbol, or both.

16. The method of claim 13, wherein communicating in accordance with the first control signal, the second control signal, the third control signal, and the SBFD interpretation rule comprises:

disregarding, in accordance with the SBFD interpretation rule, one or more first modifications of the one or more modifications indicated as overriding one or more configurations of the one or more first symbols; and disregarding, in accordance with the SBFD interpretation rule, one or more second modifications of the one or more modifications indicated as overriding one or more configurations of the one or more second symbols.

17. The method of claim 13, wherein communicating in accordance with the first control signal, the second control signal, the third control signal, and the SBFD interpretation rule comprises:

determining, based at least in part on one or more first modifications of the one or more modifications indicated as overriding one or more configurations of at least one of the one or more first symbols as flexible symbols, respective communication directionalities associated with symbols indicated in the one or more first modifications, wherein the respective communication directionalities indicate uplink transmissions to be communicated in uplink sub-bands of the one or more first symbols, downlink transmissions to be communicated in downlink sub-bands of the one or more first symbols, or any combination thereof; and communicating one or more transmissions in accordance with the determined respective communication directionalities in one or more uplink sub-bands, one or more downlink sub-bands, or both, that are associated with the symbols indicated in the one or more first modifications.

18. The method of claim 17, wherein communicating in accordance with the first control signal, the second control signal, the third control signal, and the SBFD interpretation rule comprises:

applying, to the SBFD format configuration in accordance with the SBFD interpretation rule, one or more second modifications of the one or more modifications indicated as overriding one or more configurations of the one or more second symbols.

19. The method of claim 13, wherein communicating in accordance with the first control signal, the second control signal, the third control signal, and the SBFD interpretation rule comprises:

determining, based at least in part on one or more first modifications of the one or more modifications indicated as overriding one or more configurations of at least one of the one or more first symbols as flexible symbols, respective communication directionalities associated with symbols indicated in the one or more first modifications, wherein the respective communication directionalities indicate uplink transmissions to be communicated in uplink sub-bands of the one or more first symbols, downlink transmissions to be communicated in downlink sub-bands of the one or more first symbols, or any combination thereof; and communicating one or more transmissions in accordance with the determined respective communication directionalities in one or more uplink sub-bands, one or more downlink sub-bands, or both, that are associated with the symbols indicated in the one or more first modifications.

20. A non-transitory computer-readable medium storing code for wireless communications, the code comprising instructions executable by one or more processors to:

receive a first control signal indicating a format pattern for a plurality of symbols;

receive a second control signal indicating a sub-band full duplex (SBFD) format configuration for the plurality of symbols, wherein one or more first symbols of the plurality of symbols are configured as SBFD symbols, and wherein one or more second symbols different than the one or more first symbols are configured as non-SBFD symbols;

receive a third control signal indicating one or more modifications to the SBFD format configuration for the one or more first symbols, the one or more second symbols, or both; and communicate in accordance with the first control signal, the second control signal, the third control signal, and an SBFD interpretation rule associated with the one or more modifications to the SBFD format configuration, wherein the SBFD interpretation rule indicates that the UE is to disregard one or more first modifications of the one or more modifications, the one or more first modification indicated by the third control signal as overriding one or more configurations of the one or more first symbols.

* * * * *